United States Patent [19]
Shigemasa

[11] 4,451,878
[45] May 29, 1984

[54] PROCESS CONTROL APPARATUS

[75] Inventor: Takashi Shigemasa, Yokohama, Japan

[73] Assignee: Tokyo Shibaura Denki Kabushiki Kaisha, Kawasaki, Japan

[21] Appl. No.: 283,173

[22] Filed: Jul. 14, 1981

[30] Foreign Application Priority Data

| Jul. 18, 1980 [JP] | Japan | 55-97596 |
|---|---|---|
| Jul. 18, 1980 [JP] | Japan | 55-97597 |
| Jul. 18, 1980 [JP] | Japan | 55-97598 |
| Jul. 18, 1980 [JP] | Japan | 55-97599 |
| Jul. 18, 1980 [JP] | Japan | 55-97600 |
| Aug. 19, 1980 [JP] | Japan | 55-113030 |
| Nov. 28, 1980 [JP] | Japan | 55-166793 |

[51] Int. Cl.³ ............... G05B 13/04; G05B 17/02
[52] U.S. Cl. ............... 364/151; 364/157; 364/159; 364/162; 364/553
[58] Field of Search ........... 364/149, 159, 162, 194, 364/553, 150, 151, 157, 158, 164, 165

[56] References Cited

U.S. PATENT DOCUMENTS

| 3,718,813 | 2/1973 | Williams, Jr. et al. | 364/553 |
| 4,067,060 | 1/1978 | Poussart et al. | 364/553 |
| 4,214,300 | 7/1980 | Barlow et al. | 364/159 X |
| 4,232,364 | 11/1980 | Bibbero | 364/159 X |

OTHER PUBLICATIONS

Automatica, "On Self-Tuning Regulators"; K. J. Astrom and B. Wittenmark, vol. 9, 1973, pp. 185-199.
International Journal of Control, vol. 14, No. 4, 1971, London, B. Pradhan: "On the speed of response of a model-reference...".
IEEE Transactions on Automatic Control, Dec. 1976, N. Y., T. Soderstrom.

*Primary Examiner*—Joseph F. Ruggiero
*Attorney, Agent, or Firm*—Oblon, Fisher, Spivak, McClelland & Maier

[57] ABSTRACT

A process control apparatus capable of adjusting control constants of a process control operation which controls a controlled process. The process control apparatus includes an identification signal generator for producing a maximum length sequence signal, an adder for adding this maximum length sequence signal and a control signal and supplying it as an operation signal to a process, an operation circuit for identifying the pulse transfer function of a process response from the process signal and the operation signal and processing the transfer function by Laplace-transforming the step response of the pulse transfer function, and a circuit for processing control constants according to the transfer function.

11 Claims, 20 Drawing Figures

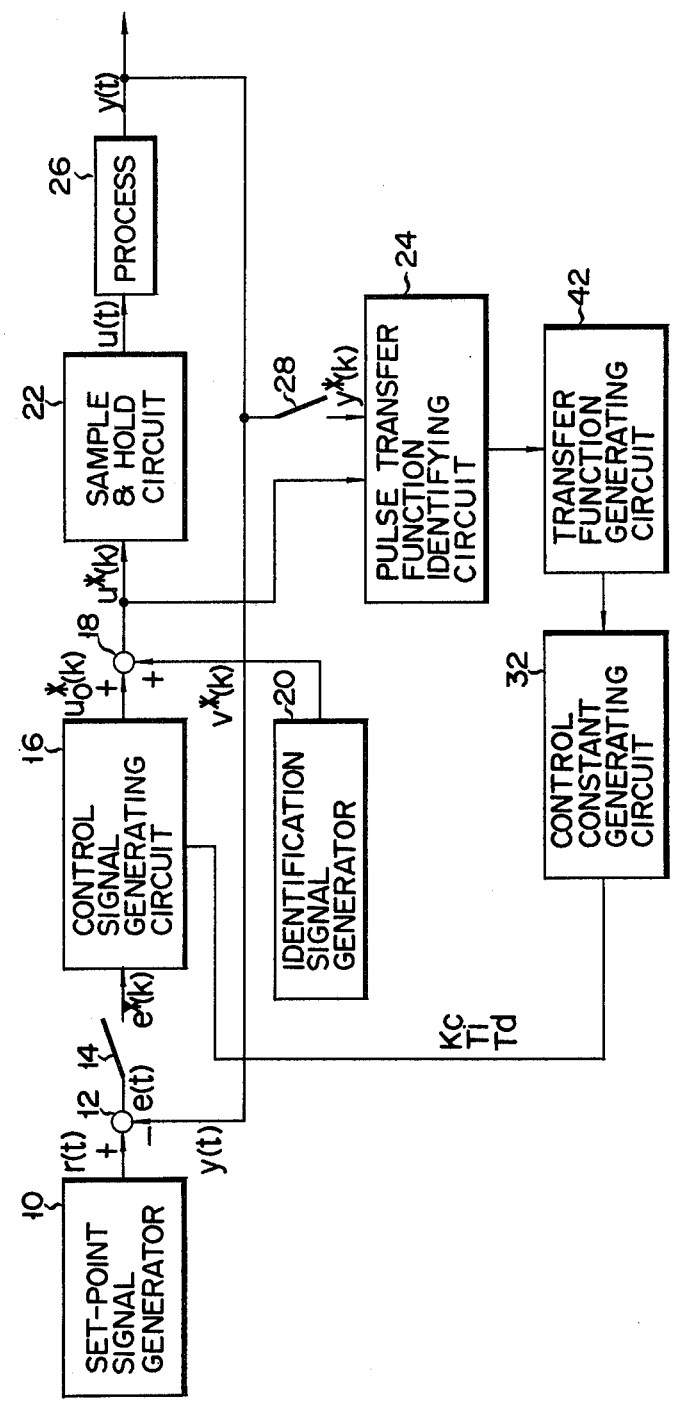
F I G. 14

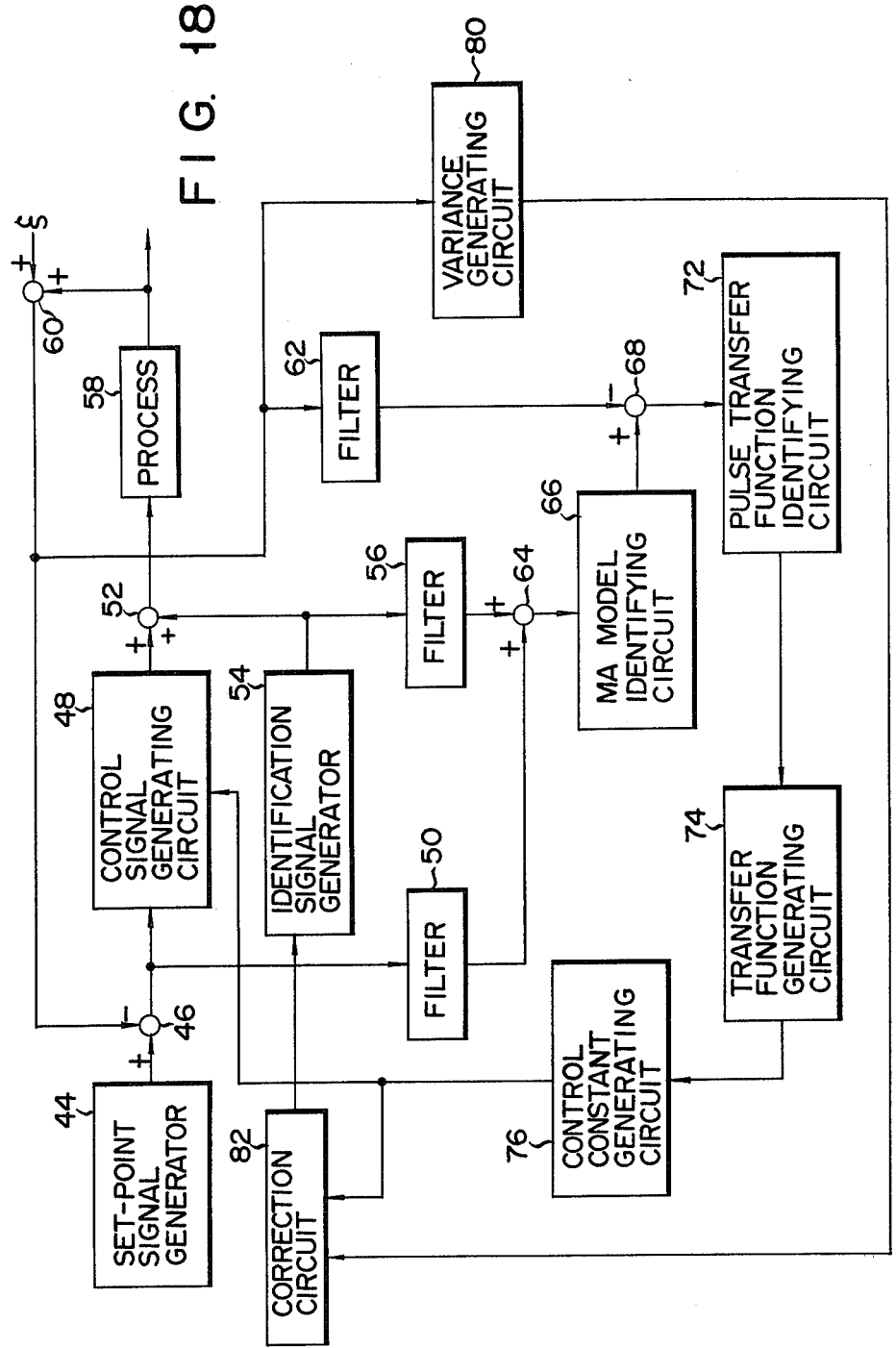
F I G. 18

PROCESS CONTROL APPARATUS

BACKGROUND OF THE INVENTION

1. Field of the Invention

The present invention relates to a process control apparatus capable of determining optimum proportional, integral and differential parameters according to the characteristic of a process.

2. Description of the Prior Art

Process control apparatus are conventionally employed to control temperature and pressure under predetermined operating conditions in processes at iron-steel plant, chemical plane and the like. As optimum control conditions of the apparatus are determined by the dynamic characteristics of the process, it is necessary to identify the dynamic characteristics. There are two ways to identify the dynamic characteristics of the process: One is an open loop identification method, which identifies the process dynamics under the condition to separate the control apparatus from the process; the other is a closed loop identification method, which identifies the process dynamics under closed loop operation. From the viewpoint of economy, quality control and safety, a closed loop identification method is designed so as to quickly respond to any change in dynamic characteristic of the process.

Based on the development of recent digital computer system, the sampled data PID (Proportional, Integral and Derivative) control apparatus are widely used which control the process time-discretely. However, none of the conventional sampled data PID control apparatus could automatically determines the PID constants under operation in closed loop. There was no way except to draw the response of the process by a pen recorder or the like and adjust the PID constants manually under the rule of trial and error referring to the response curve. Therefore, when the process is controlled in closed loop using the conventional sampled data PID controller, the adjusting work for the PID constants is troublesome and the adjustment of the PID constants spends time substantially.

SUMMARY OF THE INVENTION

The object of the present invention is to provide a process control apparatus capable of identifying process dynamic characteristics under closed loop operation and determining automatically optimum PID control constants from identified results.

The object of the present invention can be realized by a process control apparatus comprising an identification signal generator for generating a persistently-exciting signal, a circuit for generating a control signal of a process according to the control constants of the process, an adder for adding output signals of the identification signal generator and the control signal generating circuit and supplying the result of the addition as an operation signal to the process, a circuit for identifying a pulse transfer function of the process response from the process signal generated from the process and the operation signal applied to the process, a circuit for generating a transfer function in a Laplace operator region using the pulse transfer function generated by the pulse transfer function identifying circuit, and a control constant generating circuit for supplying control constants to the control signal generating circuit in response to the transfer function generated by the transfer function generating circuit.

BRIEF DESCRIPTION OF THE DRAWINGS

This invention can be more fully understood from the following detailed description when taken in conjunction with accompanying drawings, in which:

FIG. 14 is a block diagram showing a third embodiment of a process control apparatus according to the present invention;

FIG. 18 is a block diagram showing a fifth embodiment of a process control apparatus according to the present invention;

DETAILED DESCRIPTION OF THE PREFERRED EMBODIMENTS

An embodiment of a process control apparatus according to the present invention will be now described with reference to the drawings.

Figure 1:
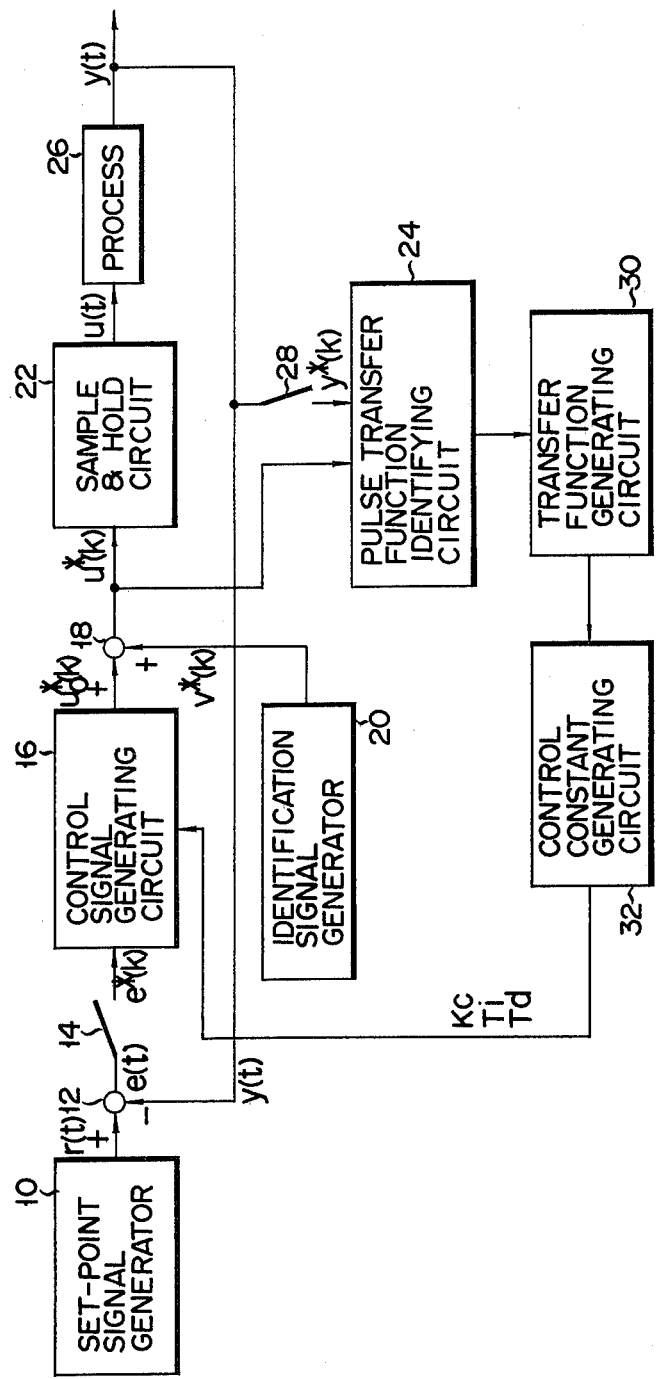
FIG. 1 is a block diagram showing an embodiment of a process control apparatus according to the present invention.

FIG. 1 is a block circuit diagram showing the embodiment of the process control apparatus. The output terminal of a set-point signal generator 10 is connected to a first input terminal of a subtracter 12, whose output terminal is connected via a sampler 14 to a sampled value control signal generating circuit 16. An output terminal of the sampled data control signal generating circuit 16 is connected to a first input terminal of an adder 18. An output terminal of an identification signal generator 20 is connected to a second input terminal of the adder 18, whose output terminal is connected to an input terminal of a sample & hold circuit 22 and a first input terminal of a pulse transfer function identifying circuit 24. An output terminal of the sample & hold circuit 22 is connected to a control terminal of a process 26, whose output terminal is connected to a second input terminal of the subtracter 12 and also to a second input terminal of the pulse transfer function identifying circuit 24 through a sampler 28, which synchronizes with the sampler 14. An output terminal of the pulse transfer function identifying circuit 24 is connected to an input terminal of a transfer function generating circuit 30, whose output terminal is connected to an input terminal of a sampled value control constant generating circuit 32. An output terminal of the sampled data control constant generating circuit 32 is connected to the sampled data control signal generating circuit 16. With this example, the control signal is sampled and processed to accelerate response characteristics but may be continuously processed when accuracy is weighed against speed. The samplers 14, 28 and sample & hold circuit 22 become unnecessary in this case.

The operation of this example will be now described. It is assumed that the process 26 be found in iron-steel plant, chemical plant and the like and that controlled process be temperature, pressure and the like in the process. Process signals relating to the controlled temperature, pressure and the like are fed back from the process 26 to the subtracter 12. Providing that the setpoint of the controlled process be represented by r(t) and that the process signal generated from the process by y(t), the output signal of the subtracter 12 is expressed by e(t)=r(t)−y(t). Providing that the sampling period of the samplers 14 and 28 be represented by $\tau$, the signal e(t) is sampled by the sampler 14 to become a deviation signal e*(k) in which k represents discrete time, and actual time is expressed by t=k$\tau$. The sampled data control signal generating circuit 16 calculates the following process control signal $u_0$*(k) from the deviation signal e*(k) using a sampled data control constants Kc (proportional gain), Ti (integral time constant) and Td (derivative time constant) and then generates it:

$$u_0^*(k) = u_0^*(k-1) + \Delta u_0^*(k) \quad (1)$$

wherein $$\Delta u_0^*(K) = Kc\left[ e^*(k) - e^*(k-1) + \frac{\tau}{Ti} e^*(k) + \frac{Td}{\tau}\{e^*(k) - 2e^*(k-1) + e^*(k-2)\}\right] \quad (2)$$

Figure 2:
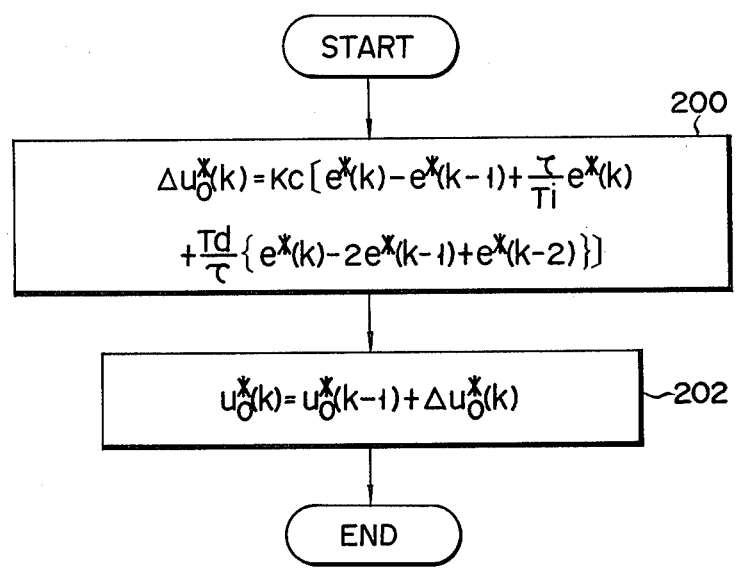
FIG. 2 is a flow chart of a control signal generating circuit employed in the embodiment of FIG. 1.

The sampled data control signal generating circuit 16 carries out arithmetic process according to the flow chart shown in FIG. 2. Namely, $\Delta u_0$*(k) is processed at a step 200 using equation (2) and $u_0$*(k) is processed at a step 202 using equation (1).

The process control signal $u_0$*(k) and the output signal v*(k) from the identification signal generating circuit 20 are added with each other by the adder 18. It is necessary that the identification signal v*(k) contains multifrequency components. The identification signal generating circuit 20 produces a persistently exciting signal as the identification signal v*(k). This identification signal v*(k) is synchronizing with the sampling period $\tau$. The persistently exciting signal means a pseudo random signal belonging to a persistent random process such as a maximum length sequence signal and random number white noise signal and is defined in the item "Identification of processes in closed loop—Identifiability and accuracy aspects" on page 65 of a magazine "Automatica" (Vol. 13, No. 1-E, 1977), for example. The maximum length sequence signal, which can be generated by using a simple algorithm, is employed as the identification signal v*(k) in this example. The maximum length sequence signal v*(k) can be expressed as follows, providing that the period be 127 and the amplitude Am:

$$v^*(k) = Am \times (2C(k) - 1) \quad (3)$$

wherein $$C(k) = MOD\{C(k-1) + C(k-7), 2\} \text{ and} \quad (4)$$

$$C(k-i) = 0 \text{ or } 1 \ (i = 0, 1, \ldots, 7)$$

The output signal u*(k)=$u_0$*(k)+v*(k) of the adder 18 is sampled and held by the sample & hold circuit 22 to be used as an operation signal u(t) applied to the process 26. An output process signal y(t) of the process 26 is sampled by the sampler 28 and this sampled process signal y*(k) is supplied to the pulse transfer function identifying circuit 24, which serves to identify the pulse transfer function from the operation signal u*(k) applied from the adder 18 and the process signal y*(k), this pulse transfer function representing the dynamic characteristics of the process 26. Since the maximum length sequence signal is employed as the identification signal in this example, it is possible on the basis of theorem found in the item "Identifiability condition for linear multivariable system operating under feedback" (T. Sonderstorm and others) on pages 837-840 of IEEE's transaction on automatic control (December, 1976) that the pulse transfer function for the process is identified from the operation signal u*(k) applied to the process which is controlled in closed loop and from the process signal y*(k) produced from the process.

Figure 3:
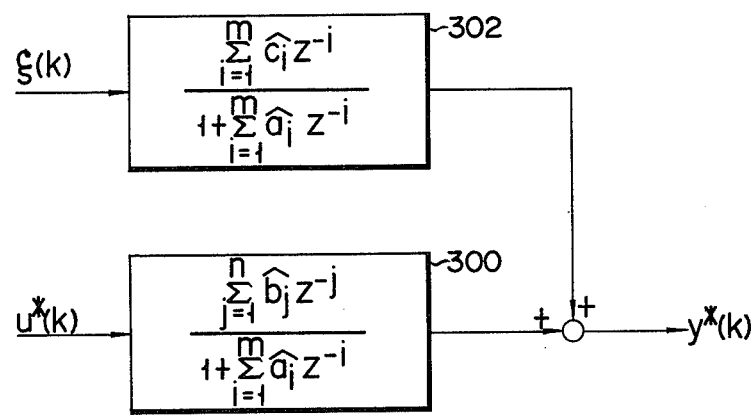
FIG. 3 is a model diagram of a controlled process.

The identification method of the pulse transfer function includes a least squares method, maximum likelihood method, instrumental variable method, extended least squares method and the like. The maximum likelihood method independent of noises and high in identification accuracy is employed in this example. Namely, the pulse transfer function identifying circuit 24 performs identification using the algorithm of identifying filter of iterative maximum likelihood type. FIG. 3 shows an equivalent model of the process which is made in view of the operation signal u*(k) and process signal y*(k). Providing that observed noise be denoted by $\xi(k)$, the equivalent model of the process is shown by a block 300 and that of observed noise by a block 302. Namely, the pulse transfer function Gp(z) of the process 26 is expressed as follows:

$$\hat{G}p(z) = \frac{\sum\limits_{j=1}^{n} \hat{b}_j z^{-j}}{1 + \sum\limits_{i=1}^{m} \hat{a}_i z^{-i}} \quad (5)$$

wherein z represents time shift operator and $z^{-i}f(k)=f(k-i)$.

Accordingly, the pulse transfer function identifying circuit 24 may only calculate parameters $\hat{a}_i(i=1\sim m)$ and $\hat{b}_j(j=1\sim n)$ of the equivalent models shown in FIG.

3. Identification values of unknown parameters to calculated are expressed by a vector $\theta$.

$$\theta^T = [\hat{a}_1, \hat{a}_2, \ldots, \hat{a}_m, \hat{b}_1, \hat{b}_2, \ldots, \hat{b}_n, \hat{c}_1, \hat{c}_2 \ldots \hat{c}_m] \quad (6)$$

The identification value vector $\theta$ is realized by the algorithm of identifying filter of iterative maximum likelihood type similar to that of Kalman filter as shown by the following equation:

$$\theta(k) = \theta(k-1) + \frac{P(k-1)\phi(k)}{\lambda(k) + \phi^T(k)P(k-1)\phi(k)} \epsilon(k) \quad (7)$$

$P(k)$ is a matrix of $(n+2m) \times (n+2m)$ as shown by the following equation:

$$P(k) = \left\{ P(k-1) - \frac{P(k-1)\phi(k)\phi^T(k)P(k-1)}{\lambda(k) + \phi^T(k)P(k-1)\phi(k)} \right\} / \lambda(k) \quad (8)$$

$\epsilon(k)$ is an identification error as shown by the following equation:

$$\epsilon(k) = y^*(k) - [-y^*(k-1), -y^*(k-2), \ldots, \quad (9)$$

$$-y^*(k-m), u^*(k-1), u^*(k-2), \ldots, u^*(k-n), \epsilon(k-1),$$

$$\epsilon(k-2), \ldots, \epsilon(k-m)] \times \theta(k-1)$$

$\phi(k)$ is a $(n+2m)$ vector as shown by the following equation:

$$\phi^T(k) = [-\tilde{y}(k-1), -\tilde{y}(k-2), \ldots, -\tilde{y}(k-m), \quad (10)$$

$$\tilde{u}(k-1), \tilde{u}(k-2), \ldots, \tilde{u}(k-n), \tilde{\epsilon}(k-1), \tilde{\epsilon}(k-2), \ldots,$$

$$\tilde{\epsilon}(k-m)]$$

Elements of $\phi(k)$ vector are approximated as follows by the iterative maximum likelihood method:

$$\tilde{y}(k) = \frac{y^*(k)}{1 + \sum_{i=1}^{m} \hat{C}_i \tilde{y}(k-i)} \quad (11)$$

$$\tilde{u}(k) = \frac{u^*(k)}{1 + \sum_{i=1}^{m} \hat{C}_i \tilde{u}(k-i)} \quad (12)$$

$$\tilde{\epsilon}(k) = \frac{\epsilon(k)}{1 + \sum_{i=1}^{m} \hat{C}_i \tilde{\epsilon}(k-i)} \quad (13)$$

$\lambda(k)$ is a forgetting factor and selected as follows:
(i) When the dynamic characteristic of the process is not changed:

$$\lambda(k) = 1.0 \quad (14)$$

or $$\lambda(k) = \alpha \times \lambda(k-1) + (1+\alpha) \quad (15)$$

wherein $0.95 \leq \lambda(0) \leq 1$ and $0.95 \leq \alpha \leq 1$.
(ii) When the dynamic characteristic of the process is changed:

$$\lambda(k) = \alpha \ (0.95 \leq \alpha \leq 1) \quad (16)$$

Initial values of $\theta(k)$ and $P(k)$ can be determined as follows:

$$\hat{\theta}(0) = 0, P(0) = \beta \times I \quad (17)$$

wherein $\beta$ represents a real number of about $10^3$ through $10^5$ and I a unit matrix.

Figure 4:
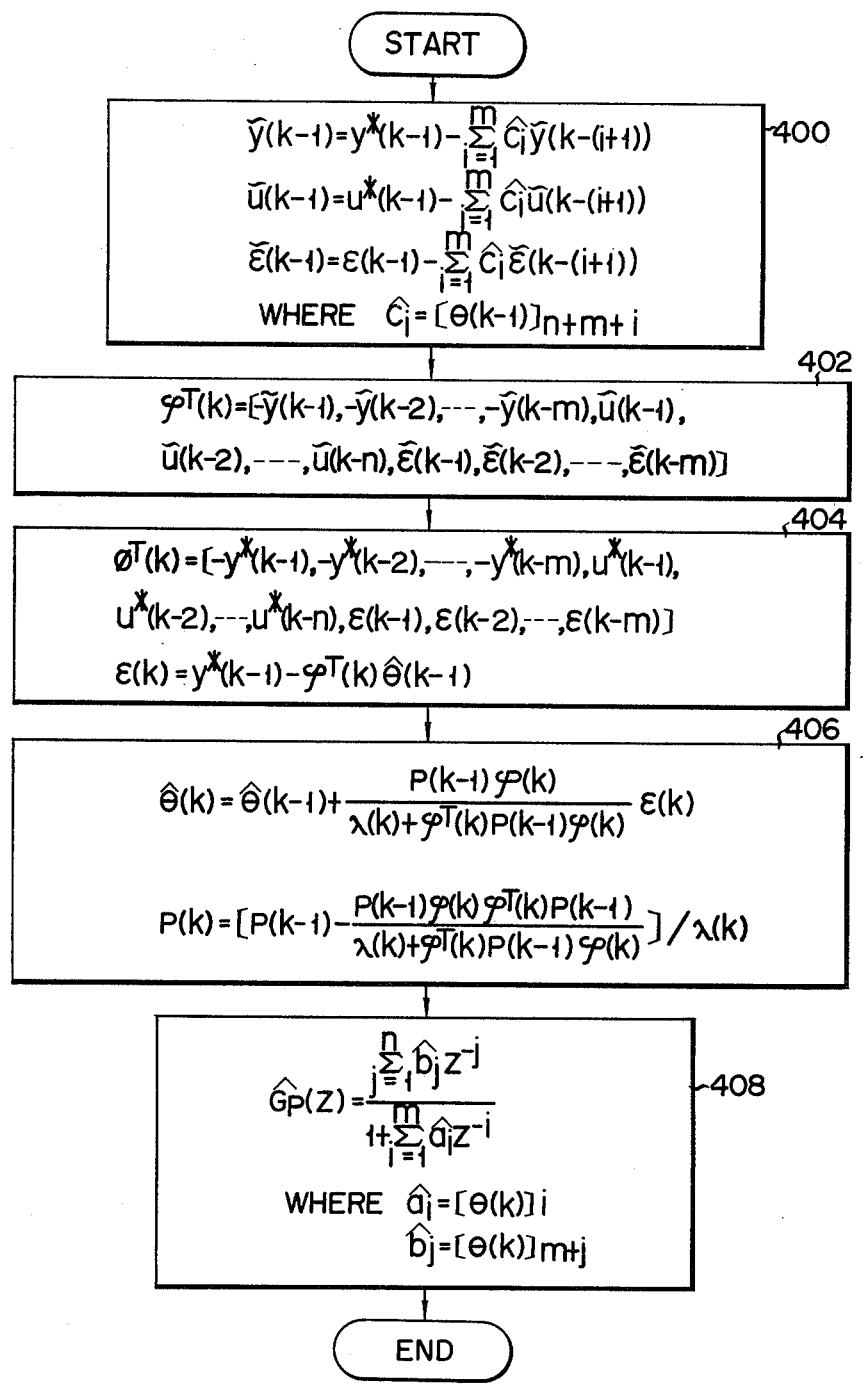
FIG. 4 is a flow chart of a pulse transfer function identifying section shown in FIG. 1.

According to such algorithm,, the pulse transfer function identifying circuit 24 reads $u^*(k)$ and $y^*(k)$ every sampling cycle $\tau$ of the sampler 28 to identify model parameters of the process and observed noise. This identifying arithmetic process is carried out according to the flow chart shown in FIG. 4. $\tilde{y}(k-1)$, $\tilde{u}(k-1)$ and $\tilde{\epsilon}(k-1)$ are obtained at a step 400 according to equations (11), (12) and (13), $\phi^T(k)$ at a step 402 according to equation (10), identification error $\epsilon(k)$ at a step 404 according to equation (9), and $\theta(k)$ and $P(k)$ at a step 406 according to equations (7) and (8). Therefore, unknown parameters $\hat{a}_i(i=1\sim m)$, $\hat{b}_j(j=1\sim n)$ and $\hat{C}_i$ ($i=1\sim m$) are obtained from $\theta(k)$ and the pulse transfer function $\hat{G}p(z)$ is calculated at a step 408 according to equation (5) and using ai and bj.

Considering that the step response of the pulse transfer function of the identified process agrees with that of an actual process, the transfer function generating circuit 30 processes the transfer function $\tilde{G}p(s)$ of the process in S region using the pulse transfer function $\hat{G}p(z)$ identified in the pulse transfer function identifying circuit 24. When the numerator is divided by the denominator in equation (5), $$\hat{G}p(z) = \sum_{i=1}^{\infty} \hat{g}_i z^{-i} \quad (18)$$

Therefore, the step response $x(k)$ of the pulse transfer function $\hat{G}p(z)$ of the identified process is obtained as follows:

$$x(k) = \sum_{i=1}^{k} \hat{g}_i \quad (19)$$

Since k represents discrete time, $x(k)$ is also obtained as a discrete value. Therefore, a continuous response $\tilde{x}(t)$ obtained by approximating $x(i)$ and $x(i+1)$ by a straight line is as follows:

$$\tilde{x}(t) = \sum_{i=0}^{n-1} \hat{g}_i + \frac{\hat{g}_n}{\tau} t \quad (20)$$

wherein $(n-1)\tau \leq t < n\tau$ $\tilde{x}(s)$ obtained by Laplace-transforming $\tilde{x}(t)$ is expressed as follows:

$$\tilde{X}(s) = \frac{e^{\tau s} - 1}{\tau s^2} \sum_{i=1}^{\infty} \hat{g}_i e^{-i\tau s} \quad (21)$$

When $\tilde{X}(s)$ is regarded as the step response of the transfer function $\tilde{G}p(s)$ of the process, $\tilde{G}p(s)$ is expressed by the following equation:

$$\tilde{G}p(s) = s \cdot \tilde{X}(s) = \frac{e^{\tau s} - 1}{\tau s} \sum_{i=1}^{\infty} \tilde{g}_i e^{-i\tau s} \quad (22)$$

Second item on the right side of equation (22) is infinite series and can not be therefore numerically calculated. When the equivalent relation between equation (5) and (18) is employed, equation (22) becomes as follows:

$$\tilde{G}p(s) = \frac{e^{\tau s} - 1}{\tau s} \cdot \frac{\sum_{j=1}^{n} \hat{b}_j e^{-j\tau s}}{1 + \sum_{i=1}^{m} \hat{a}_i e^{-i\tau s}} \quad (23)$$

When the exponential function in equation (23) is expanded using till third order term of s but rounding off biquadratic term and the following, $\tilde{G}p(s)$ can be expressed by a denominator type transfer function as set forth below:

$$\tilde{G}p(s) = \frac{1}{\tilde{h}_0 + \tilde{h}_1 s + \tilde{h}_2 s^2 + \tilde{h}_3 s^3 + \ldots} \quad (24)$$

wherein $$\tilde{h}_0 = D_0 \quad (25)$$

$$\tilde{h}_1 = D_1 - \frac{\tau}{2} \tilde{h}_0 \quad (26)$$

$$\tilde{h}_2 = D_2 - \frac{\tau}{2} \tilde{h}_1 - \frac{\tau^2}{6} \tilde{h}_0 \quad (27)$$

$$\tilde{h}_3 = D_3 - \frac{\tau}{2} \tilde{h}_2 - \frac{\tau^2}{6} \tilde{h}_1 - \frac{\tau^3}{24} \tilde{h}_0 \quad (28)$$

$$D_0 = A_0/B_0 \quad (29)$$

$$D_1 = (A_1 - D_0 B_1)/B_0 \quad (30)$$

$$D_2 = (A_2 - D_0 B_2 - D_1 B_1)/B_0 \quad (31)$$

$$D_3 = (A_3 - D_0 B_3 - D_1 B_2 - D_2 B_1)/B_0 \quad (32)$$

$$A_0 = 1 + \sum_{i=1}^{m} \hat{a}_i \quad (33)$$

$$A_1 = -\tau \sum_{i=1}^{m} i \hat{a}_i \quad (34)$$

$$A_2 = \frac{\tau^2}{2} \sum_{i=1}^{m} i^2 \hat{a}_i \quad (35)$$

$$A_3 = -\frac{\tau^3}{6} \sum_{i=1}^{m} i^3 \hat{a}_i \quad (36)$$

$$B_0 = \sum_{i=1}^{n} \hat{b}_i \quad (37)$$

$$B_1 = -\tau \sum_{i=1}^{n} i \hat{b}_i \quad (38)$$

$$B_2 = \frac{\tau^2}{2} \sum_{i=1}^{n} i^2 \hat{b}_i \quad (39)$$

$$B_3 = -\frac{\tau^3}{6} \sum_{i=1}^{n} i^3 \hat{b}_i \quad (40)$$

Figure 5:
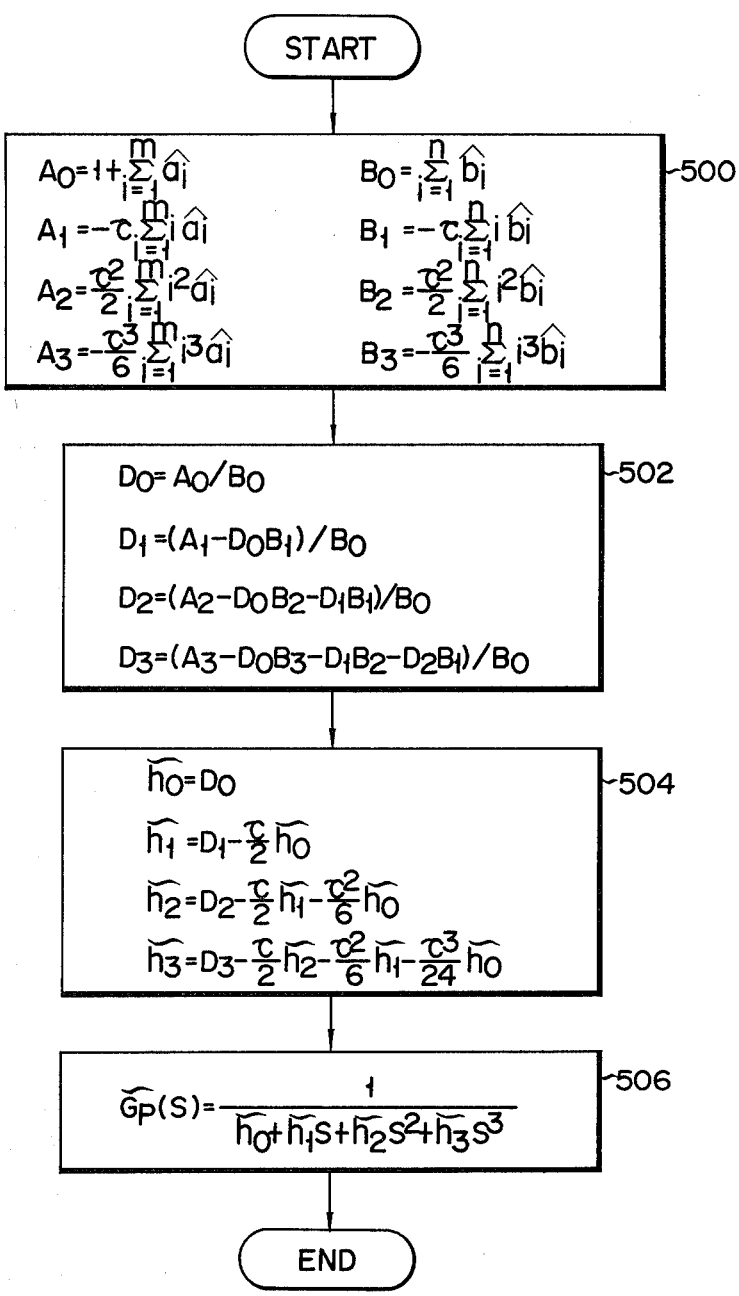
FIG. 5 is a flow chart of a transfer function generating circuit shown in FIG. 1.

According to this algorithm, the transfer function generating circuit 30 calculates the transfer function $\hat{G}p(s)$ in S region from the pulse transfer function $\hat{G}p(z)$ every sampling period. This arithmetic process is performed according to the flow chart shown in FIG. 5. $A_0, A_1, A_2, A_3, B_0, B_1, B_2$ and $B_3$ are obtained at a step 500 according to equations (33) through (40), $D_0, D_1, D_2$ and $D_3$ at a step 502 according to equations (29) through (32), $\tilde{h}_0, \tilde{h}_1, \tilde{h}_2$ and $\tilde{h}_3$ at a step 504 according to equations (25) through (28), and $\tilde{G}p(s)$ at a step 506 according to equation (24).

The control constant generating circuit 32 processes the control constants Kc (proportional gain), Ti (integral time constant) and Td (derivative time constant) from the transfer function $\tilde{G}p(s)$ of the process in the S region. This processing method is based on an item "A design method for sampled-data control systems based upon partial knowledge about controlled processes" (T. Kitamori) on pages 131 to 136 of transactions of the society of instrument and control engineers (vol. 15, No. 5, September, 1979). It is assumed that the operation mode of the sampled data control be either PID operation or PI operation. Namely, a polynomial relating to $\sigma$ is formed by preconditioning that the transfer function $\tilde{G}p(s)$ shown by equation (24) is equal to a reference model Gm(s) of the transfer function.

$$Gm(s) = \frac{1}{\alpha_0 + \alpha_1 \sigma s + \alpha_2 \sigma^2 s^2 + \alpha_3 \sigma^3 s^3 + \alpha_4 \sigma^4 s^4 \ldots}$$

wherein $[\alpha_0, \alpha_1, \alpha_2, \alpha_3, \alpha_4, \ldots] = [1, 1, 0.5, 0.15, 0.03, \ldots]$ $\Delta t$ is employed considering the case where the sampling period is different from the identifying sampling period. As shown below, a third order polynomial is obtained relating to $\sigma$ in the case of PID operation and a second order polynomial is obtained relating to $\sigma$ in the case of PI operation. In the case of PID operation:

$$\sigma^3 - 20 \frac{\tilde{h}_1 + \Delta t \tilde{h}_0}{\tilde{h}_0} \sigma^2 + 100 \frac{\tilde{h}_2 + \Delta t \tilde{h}_1 + (\Delta t^2/2) \tilde{h}_0}{\tilde{h}_0} \sigma - \quad (41)$$

$$200 \frac{\tilde{h}_3 + \Delta t \tilde{h}_2 + (\Delta t^2/3) \tilde{h}_1}{\tilde{h}_0} = 0$$

In the cae of PI operation:

$$\sigma^2 - 5 \frac{\tilde{h}_1 + (\Delta t/2) \tilde{h}_0}{\tilde{h}_0} \sigma + 10 \frac{\tilde{h}_2 + (\Delta t/2) \tilde{h}_1}{\tilde{h}_0} = 0 \quad (42)$$

Equations (41) and (42) are solved relating to $\sigma$ and the smallest positive root of obtained roots is regarded as $\sigma^*$. The proportional gain Kc, integral time constant Ti and derivative time constant Td are obtained as follows using $\sigma^*$:

$$Kc = C^{(1)} \quad (43)$$
$$Ti = C^{(1)}/C^{(0)} \quad (44)$$
$$Td = C^{(2)}/C^{(0)} \quad (45)$$

wherein $$C^{(0)} = \tilde{h}_0/\sigma^* \quad (46)$$

$$C^{(1)} = \left( \tilde{h}_1 - \frac{\tilde{h}_0}{2} \sigma^* \right) /\sigma^* \quad (47)$$

and $$C^{(2)} = \left\{ \left( \tilde{h}_2 + \frac{\Delta t}{2} \tilde{h}_1 \right) - \left( \frac{\tilde{h}_1}{2} + \frac{\Delta t}{4} \tilde{h}_0 \right) \sigma^* + \quad (48) \right.$$

$$\left. \frac{\tilde{h}_0}{10} \sigma^{*2} \right\} / \sigma^*$$

Figure 6:
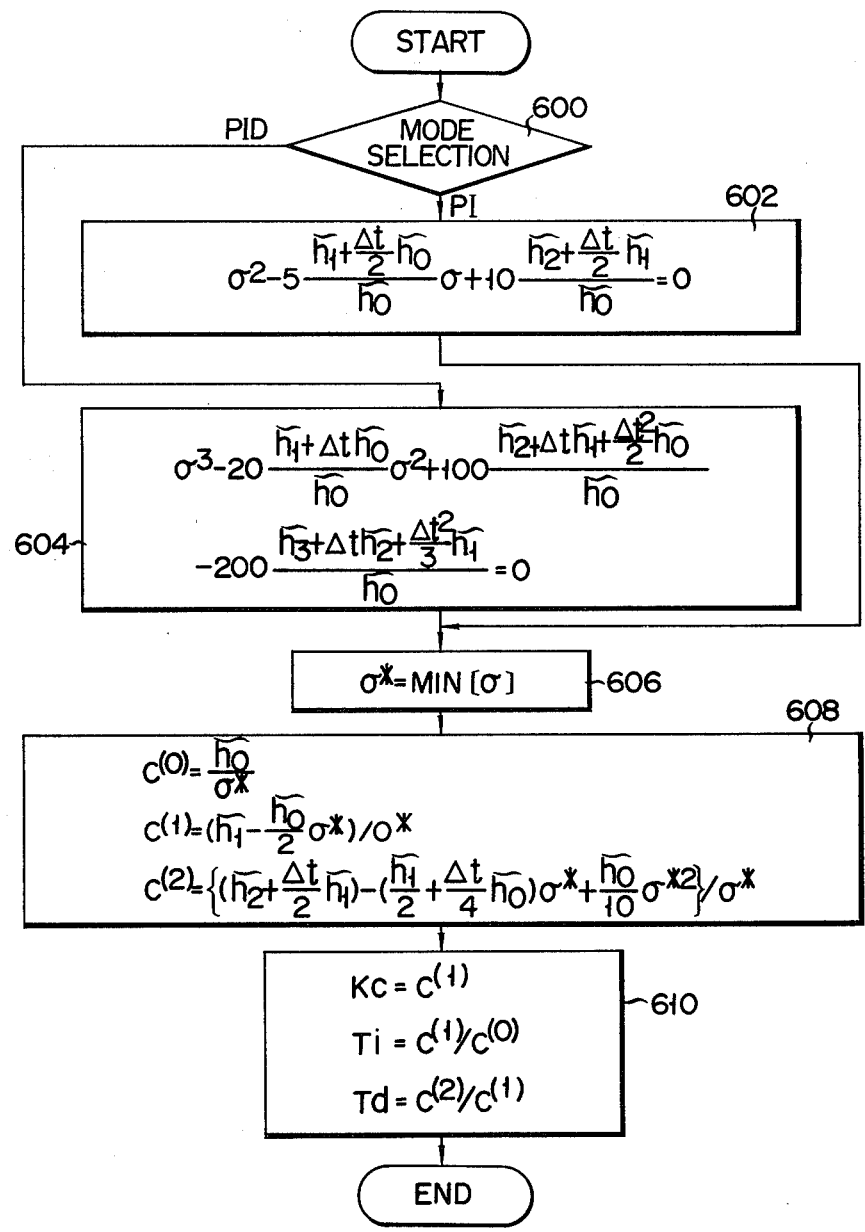
FIG. 6 is a flow chart of a control constant generating circuit shown in FIG. 1.

The control constant generating circuit 32 performs arithmetic process according to the flow chart shown in FIG. 6. Either PI operation or PID operation is selected at a step 600. When the PI operation is selected, equation (42) is formed at a step 602 and when the PID operation is selected, equation (41) is formed at a stpe 604. The smallest positive root of roots is taken as $\sigma^*$ and $C^{(0)}$, $C^{(1)}$ and $C^{(2)}$ are processed at a step 608 according to equations (46) to (48) and the proportional gain Kc, integral time constant Ti and derivative time constant Td are processed at a step 610 according to equations (43) to (45). The control signal generating circuit 16 calculates the operation signal $u_0^*(k)$ from Kc, Ti and Td thus obtained according to equations (1) and (2), and the operation signal $u_0^*(k)$ is applied to the process to effect process control.

Figure 7:
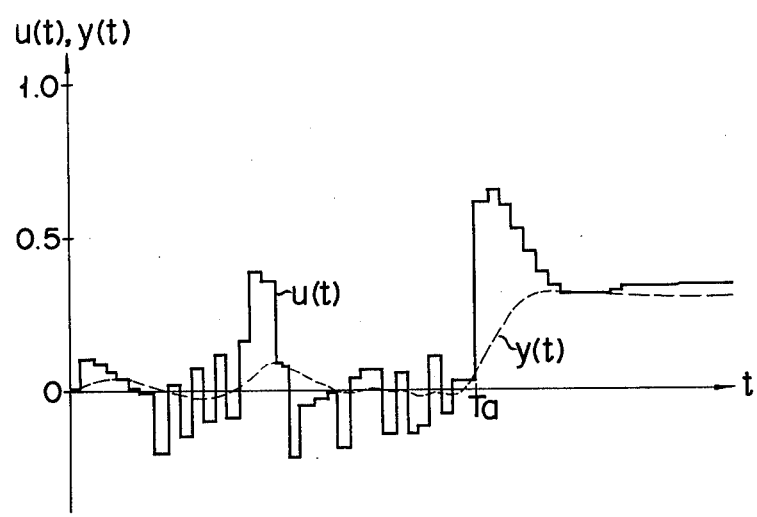
FIG. 7 is a graph of process characteristics showing the operation of this embodiment.

According to this embodiment as discribed above, a process control apparatus capable of identifying the process dynamic characteristics under closed loop operation and automatically tuning optimal PID control constants from the identified result can be realized. FIG. 7 shows the operation signal u(t) and process signal y(t) in the case where this embodiment of the process control apparatus was applied to a second order process. The operation signal u(t) is shown by a solid line and process signal y(t) by a broken line. The period ranging from time t=0 to time t−Ta represents a time period during which the maximum length sequence signal is injected under closed loop operation to identify the process and the sampled data control constants are repeatedly performed, and the period after time t=Ta represents a step response period when the setpoint of the process was changed by 0.2 using the control constants finally obtained. As apparent from FIG. 7, a step response having excellent dumping characteristics was obtained.

As described above, the small identification signals are employed to identify the dynamic characteristics of the process and the process is not therefore largely fluctucated as compared with the conventional Ziegler-Nichols method, limit cycle method and the like, thus allowing the process to be quickly identified. In addition, the iterative maximum likelihood type filter similar to the Kalman filter is employed to identify the pulse transfer function of the process. Therefore, the statistical operation automatically performed and the filter effect is achieved to thereby keep the observed noise uninfluenced. The maximum length sequence signal is employed as the identification signal and the identification signal takes only two values (+1, −1) or three values (+1, 0, −1), thus allowing the process to be safely identified. In addition, the maximum length sequence signal contains many frequency components to thereby shorten the identifying time period.

Figure 8:
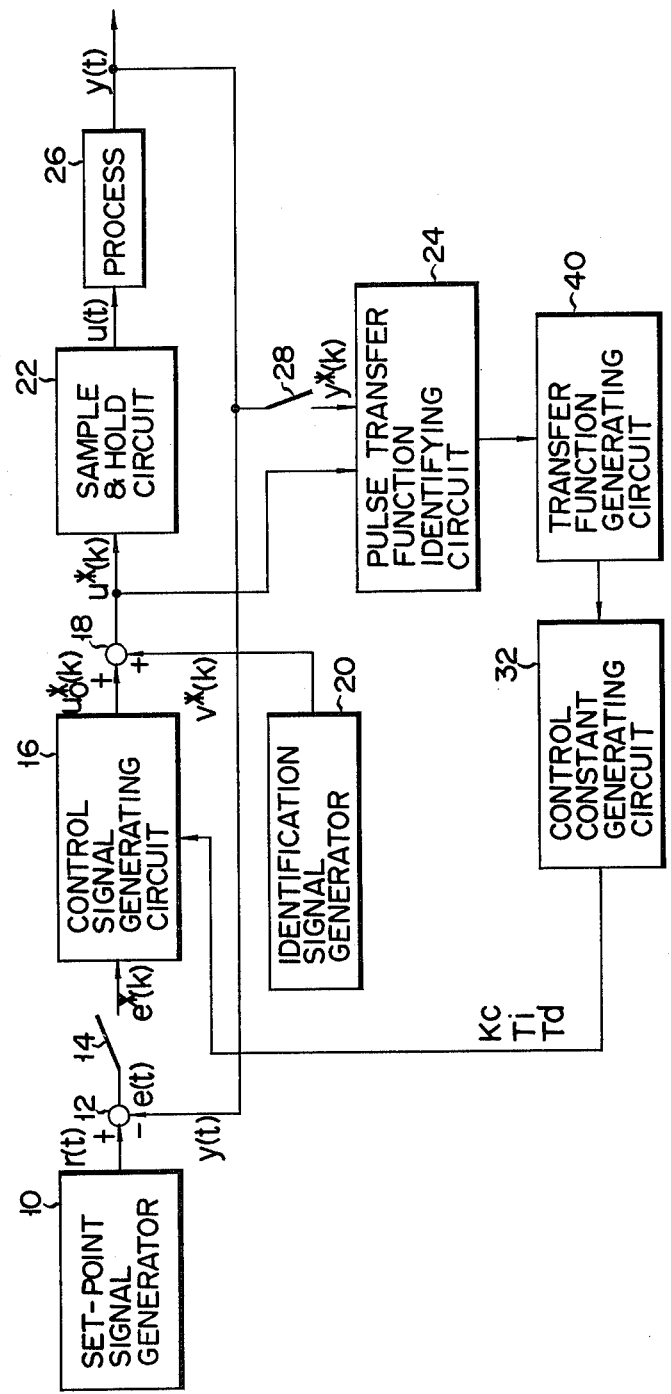
FIG. 8 is a block diagram showing a second embodiment of a process control apparatus according to the present invention.

Another embodiment of the process control apparatus according to the present invention will be now described. Same parts as those of the first embodiment are represented by same reference numerals and the description about these same parts will be omitted. FIG. 8 is a block diagram showing the second embodiment of the process control apparatus according to the present invention. The second embodiment is the same as the first embodiment except that a pulse transfer function generating circuit 40 is different from the pulse transfer function generating circuit 30 of the first embodiment. The pulse transfer function generating circuit 40 calculates a transfer function $\tilde{G}p(s)$ of a second order process with a dead time and step response of the pulse transfer function $\hat{G}p(z)$.

$$\tilde{G}p(s) = \frac{Ke^{-LS}}{(T_1S + 1)(T_2S + 1)} \quad (49)$$

Figure 9:
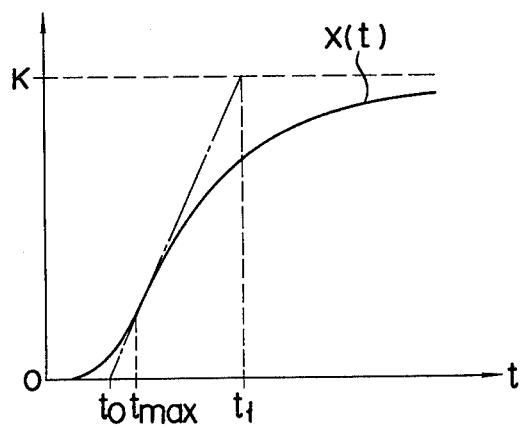
FIG. 9 is a graph showing characteristics of a controlled process.

FIG. 9 shows a step response of the transfer function $\tilde{G}p(s)$ expressed by equation (49). Providing that the time at which the step response is sloped maximum, which is shown by a broken line in FIG. 9, be $t_{max}$, times at which the broken line crosses $\tilde{G}p(s)=0$ and $\tilde{G}p(s)=K$ be $t_0$ and $t_1$, $t_1-t_0=Ta$ and $t_1-t_{max}=Tb$, the following relations will be established between L, $T_1$, $T_2$ in equation (49) and Ta, Tb:

$$t_{max} = L + \frac{T_1 T_2}{T_1 - T_2} \ln\left(\frac{T_1}{T_2}\right) \quad (50)$$

$$Ta = T_1\left\{\left(\frac{T_2}{T_1}\right)^{\frac{T_2}{T_1-T_2}}\right\} \quad (51)$$

$$Tb = T_1 + T_2 \quad (52)$$

Providing that $\alpha=Tb/Ta$ and $\beta=T_2/T_1$, L, $T_1$ and $T_2$ will be expressed as follows:

$$\alpha = (1 + \beta) \cdot \beta^{\frac{\beta}{1-\beta}} \quad (53)$$

$$T_1 = Ta\alpha/(1 + \beta) \quad (54)$$
$$T_2 = Ta\alpha\beta/(1 + \beta) \quad (55)$$

$$L = t_{max} - Ta\alpha\beta\ln\left(\frac{1}{\beta}\right) /(1 - \beta)^2 \quad (56)$$

When $\alpha$ is obtained, $\beta$ can be calculated from the relation of equation (53). When Ta and $t_{max}$ are obtained, $T_1$, $T_2$ and L can be calculated.

Therefore, $t_{max}$, $\alpha$ and Ta are firstly calculated from the pulse transfer function $\hat{G}p(z)$. When the pulse transfer function $\hat{G}p(z)$ is expressed in denominator type like equation (18) in the case of the first embodiment, $$\hat{G}p(z) = \sum_{i=1}^{\infty} \hat{g}_i z^{-i}$$

The impulse (or step response $g_i$ is expressed as follows:

$$\hat{g}_1 = \hat{b}_1 \quad (57\text{-}1)$$
$$\hat{g}_2 = \hat{b}_2 - \hat{a}_1\hat{g}_1 \quad (57\text{-}2)$$
$$\hat{g}_3 = \hat{b}_3 - \hat{a}_1\hat{g}_2 - \hat{a}_2\hat{g}_1 \quad (57\text{-}3)$$
$$\ldots$$

$$\hat{g}_n = \hat{b}_n - \hat{a}_1\hat{g}_{n-1} - \ldots - \hat{a}_m\hat{g}_{n-m} \quad (57\text{-}n)$$

The maximum of these impulses causes the step response to be sloped maximum. Namely, the maximum impulse $\hat{g}_{max}$ becomes as follows:

$$\hat{g}_{max} = \text{MAX}\,[\hat{g}_1, \hat{g}_2, \ldots, \hat{g}_n] \quad (58)$$

Providing that the maximum impulse corresponds to MX-th one, the time $t_{max}$ at which the maximum slope is caused is written as follows:

$$t_{max} = (MX - 1)\,\tau \quad (59)$$

Ta is expressed as follows by the tangent line relative to the step response at the time of maximum slope:

$$Ta = \frac{\tau}{\hat{g}_{max}} K \quad (60)$$

And $\alpha$ is formed from the proportional relation between Ta, Tb and K:

$$\alpha = 1 - \left( \sum_{i=1}^{MX-1} \hat{g}_i \right) / K \quad (61)$$

The proportional gain K of the process becomes as follows putting $z = 1$ into equation (5), $$K = \sum_{j=1}^{n} \hat{b}_j / \left( 1 + \sum_{i=1}^{m} \hat{a}_i \right) \quad (62)$$

When $t_{max}$, Ta and $\alpha$ are obtained, $T_1$, $T_2$, L and K can also be obtained from equations (54) through (56) and (62). The transfer function generating circuit 30 can thus calculate transfer function Gp(s) of the second order process with the dead time. However, an exponential function is included in equation (49) and therefore, this exponential function is Taylor-expanded and expressed as follows in denominator type:

$$\tilde{G}_p(s) = \frac{1}{\tilde{h}_0 + \tilde{h}_1 S + \tilde{h}_2 S^2 + \tilde{h}_3 S^3 + \ldots} \quad (63)$$

wherein
$$\tilde{h}_0 = 1/K \quad (64)$$
$$\tilde{h}_1 = (T_1 + T_2 + L)/K \quad (65)$$

$$\tilde{h}_2 = \left\{ T_1 T_2 + (T_1 + T_2)L + \frac{L^2}{2} \right\} / K \quad (66)$$

and $$\tilde{h}_3 = \left\{ T_1 T_2 L + (T_1 + T_2)\frac{L^2}{2} + \frac{L^3}{6} \right\} / K \quad (67)$$

Figure 10:
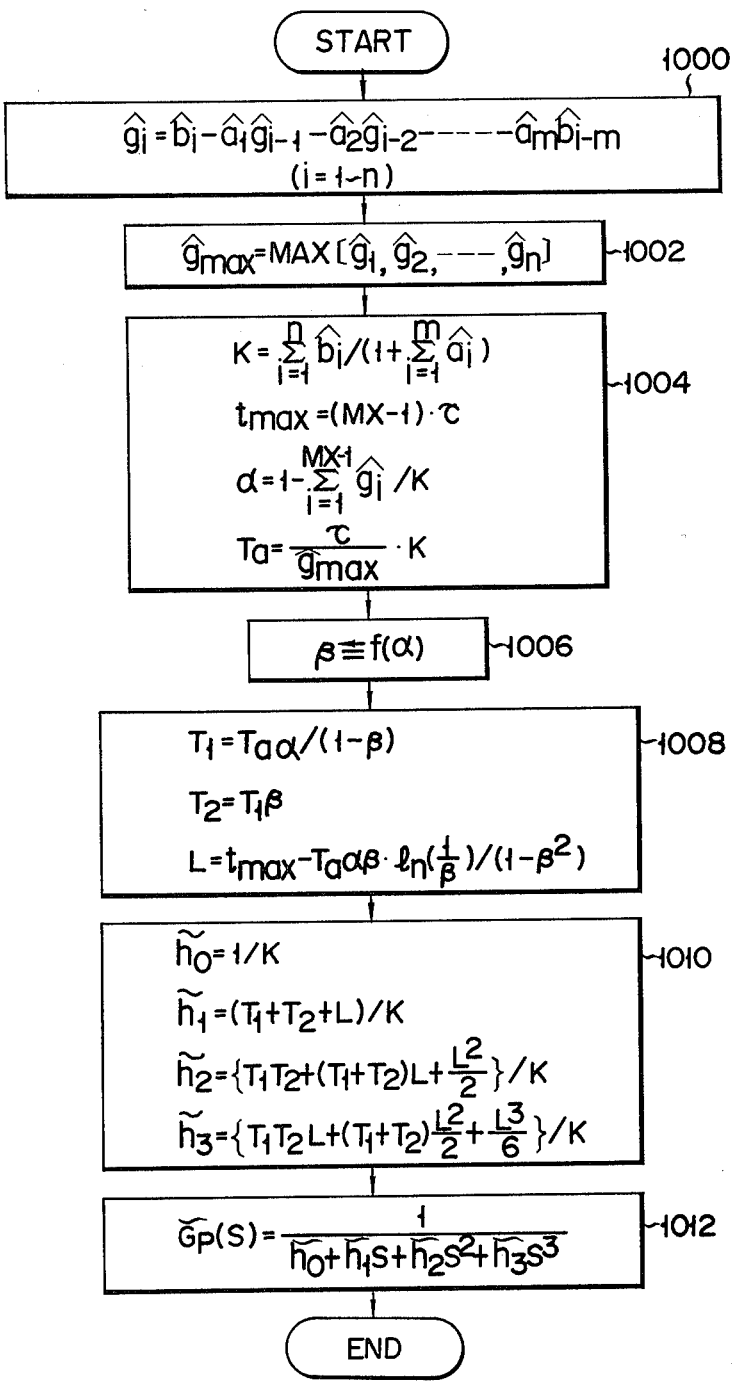
FIG. 10 is a flow chart of a transfer function generating circuit shown in FIG. 8.
Figure 11:
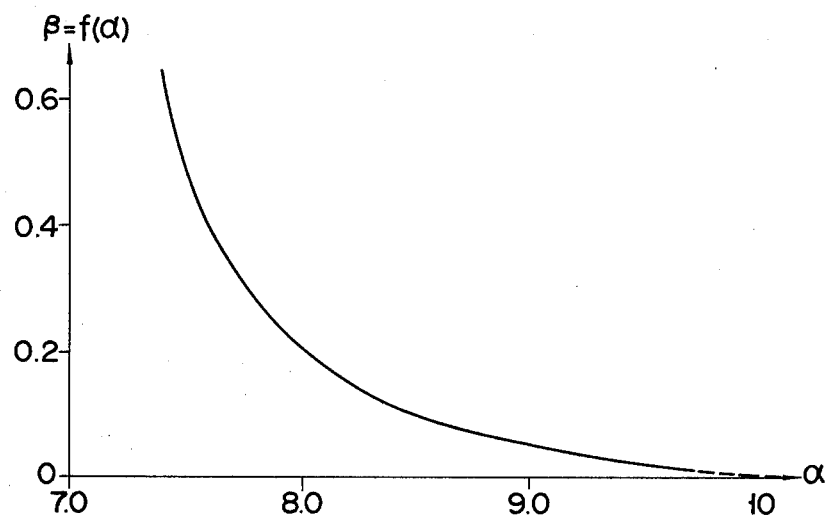
FIG. 11 is a graph showing characteristics of a step 1006 shown in the flow chart of FIG. 10.

FIG. 10 shows the flow chart of the process of the transfer function generating circuit 30. $\hat{g}_1, \hat{g}_2, \ldots, \hat{g}_n$ are calculated at a step 1000 according to equations (57-1) through (57-n) and the maximum value $\hat{g}_{max}$ of them is then calculated at a step 1002. $t_{max}$, Ta, $\alpha$ and K are processed at a step 1004 according to equations (59) through (62) and $\beta$ is obtained at a step 1006 by calculating equation (53) reversely. FIG. 11 shows a function of $\beta = f(\alpha)$ obtained from equation (53). $T_1$, $T_2$ and L are obtained at a step 1800 according to equations (54) through (56), $\tilde{h}_0, \tilde{h}_1, \tilde{h}_2$ and $\tilde{h}_3$ at a step 1010 according to equations (64) through (67), and the transfer function $\tilde{G}_p(s)$ in the S region at a step 1012 according to equation (63).

The algorithm of the sampled data control constant generating circuit 32 which calculates the sampled data control constants Kc, Ti and Td from the second order transfer function $\tilde{G}_p(s)$ with the dead time is the same as that in the case of the first embodiment.

The second order process was actually identified according to the second embodiment to obtain the following transfer function Gp(s):

$$Gp(s) = \frac{1}{1.387 + 21.628S + 46.377S^2} \quad (68)$$

Figure 12:
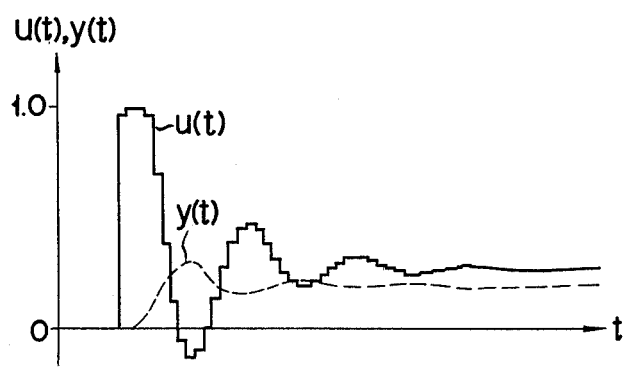
FIGS. 12 and 13 are graphs showing control characteristics of a process, respectively, when the conventional apparatus and this second embodiment are used.
Figure 13:
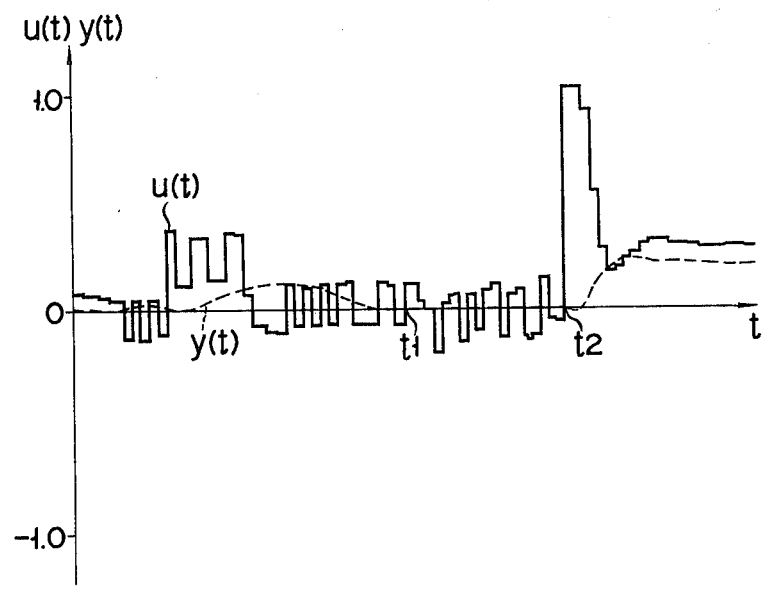

FIG. 12 shows the operation signal u(t) (shown by a solid line) and process signal y(t) (shown by a broken line) at the time when the step response (the set-point was changed by 0.2) was carried out using the conventional PID control apparatus, which corresponds to the one shown in FIG. 8 and with the identification signal generator 20, pulse transfer function identifying circuit 24, transfer function generating circuit 40 and control constant generating circuit 32 removed therefrom. The sampling period $\tau$ equals to 0.2 second, proportional gain Kc to 4.11, and integral time constant Ti to 5.0 seconds. The over-shoot of about 50 percents was caused and a setting time was about 60 seconds. This response could not be said so good. On the contrary, FIG. 13 shows the operation signal u(t) (shown by a solid line) and process signal y(t) shown by a broken line) at the time when the process dynamic characteristics are identified under closed loop operation according to the second embodiment, most proper sampled data PI constants are processed from the identified results and the step response (the set-point is similarly changed by 0.2) is carried out according to the processed results. The time period from $t=0$ to $t=t_1$ represents a time period during which the control constants Kc and Ti are fixed to 10 and 15.6, respectively, the maximum length sequence signal having an amplitude of 0.1 is injected into the process, and the process is identified in closed loop. The time period of $t=t_1$ to $t=t_2$ represents a time period during which the pulse transfer function identifying circuit 24, transfer function generating circuit 40 and control constant generating section 32 are operated to control the process. The time period after $t=t_2$ denotes a step response period in which the set-point is changed by 0.2 using the converged control constants Kc=4.063 and Ti=15.605. According to this second embodiment, the overshoot of about 10 percents is caused and the setting time is about 18 seconds. Accordingly, it is understood that a step response having excellent dumping characteristics can be obtained and that appropriate control constants can be obtained.

A third embodiment of the process control apparatus according to the present invention will be now described. FIG. 14 is a block diagram of the third embodiment, which is different in a transfer function generating circuit 42 from the first embodiment. The pulse transfer function Ĝp(z) identified in the pulse transfer function identifying circuit 24 practically represents the one obtained by z-transforming the product of the transfer functions of the sample & hold circuit 22 and process 26 and includes the property of the sample & hold circuit 22. Therefore, for the purpose of obtaining the true transfer function Ĝp(z) of the process, it is necessary not to transfer $\tilde{G}p(z)$ to the S region assuming $z=\exp(\tau S)$ but to exclude the characteristics of the sample & hold circuit 22. Since the transfer function of the sample & hold circuit 22 is $$\frac{1 - e^{-\tau s}}{s},$$

the transfer function $\tilde{G}p(s)$ in the S region can be expressed as follows:

$$\tilde{G}p(s) = \frac{\tau s}{1 - e^{-\tau s}} Gp(e^{\tau s}) \tag{69}$$

The first term on the right side of equation (69) becomes as follows by Taylor-expanding the exponential function of the denominator:

$$\text{first term} = \frac{1}{1 - \frac{1}{2}\tau s + \frac{1}{6}\tau^2 s^2 - \frac{1}{24}\tau^3 s^3 + \ldots} \tag{70}$$

The second term on the right side of equation (69) becomes as follows by substituting $e^{\tau s}$ for z of equation (5), Taylor-expanding the exponential function, and rounding denominator and numerator by the power of s:

$$\hat{G}p(e^{\tau s}) = \frac{B_0 + B_1 s + B_2 s^2 + B_3 s^3 + \ldots}{A_0 + A_1 s + A_2 s^2 + A_3 s^3 + \ldots} \tag{71}$$

wherein $$A_0 = 1 + \sum_{i=1}^{m} \hat{a}_i \tag{72}$$

$$A_1 = -\tau \sum_{i=1}^{m} i\, \hat{a}_i \tag{73}$$

$$A_2 = \frac{\tau^2}{2} \sum_{i=1}^{m} i^2 \hat{a}_i \tag{74}$$

$$A_3 = -\frac{\tau^3}{6} \sum_{i=1}^{m} i^3 \hat{a}_i \tag{75}$$

$$B_0 = \sum_{i=1}^{n} \hat{b}_i \tag{76}$$

$$B_1 = -\tau \sum_{i=1}^{n} i\, \hat{b}_i \tag{77}$$

$$B_2 = \frac{\tau^2}{2} \sum_{i=1}^{n} i^2 \hat{b}_i \tag{78}$$

and $$B_3 = -\frac{\tau^3}{6} \sum_{i=1}^{n} i^3 \hat{b}_i \tag{79}$$

Transfer function $\tilde{G}p(s)$ in S region of the process is obtained as follows by putting equations (70) through (79) into equation (69):

$$\tilde{G}p(s) = \frac{1}{\tilde{h}_0 + \tilde{h}_1 s + \tilde{h}_2 s^2 + \tilde{h}_3 s^3 + \ldots} \tag{80}$$

wherein $$\tilde{h}_0 = A_0/B_0 \tag{81}$$

$$\tilde{h}_1 = \left( A_1 - \frac{\tau}{2} A_0 - \tilde{h}_0 B_1 \right) /B_0 \tag{82}$$

$$\tilde{h}_2 = \left( A_2 - \frac{\tau}{2} A_1 + \frac{\tau^2}{6} A_2 - \tilde{h}_0 B_2 - \tilde{h}_1 B_1 \right) /B_0 \tag{83}$$

and $$\tilde{h}_3 = \left( A_3 - \frac{\tau}{2} A_2 + \frac{\tau^2}{6} A_1 - \frac{\tau^3}{24} A_0 - \tilde{h}_0 B_3 - \tilde{h}_1 B_2 - \tilde{h}_2 B_1 \right) /B_0 \tag{84}$$

Figure 15:
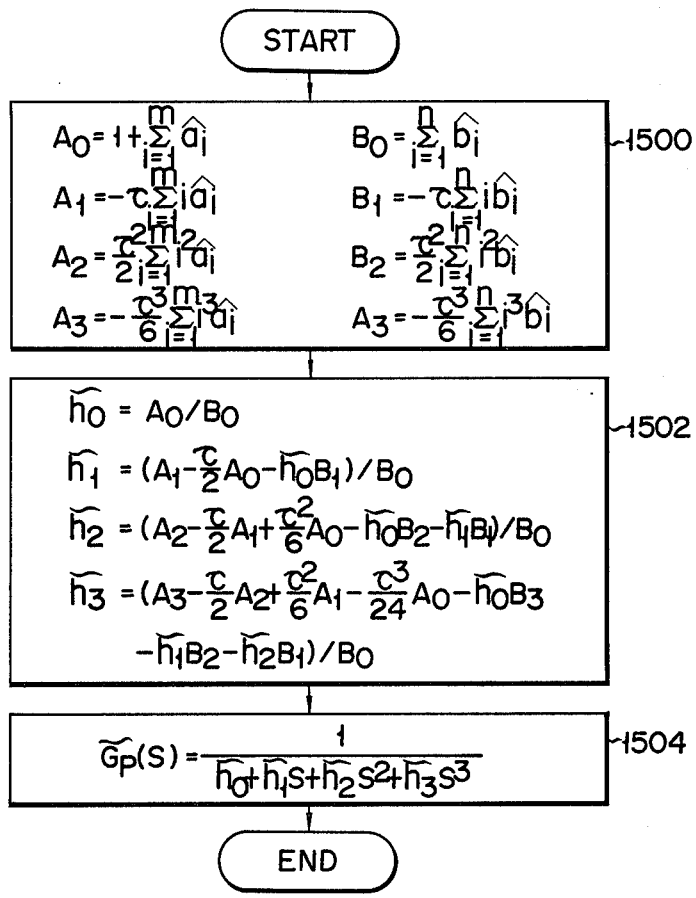
FIG. 15 is a flow chart of a pulse transfer function identifying section shown in FIG. 14.

FIG. 15 shows the flow chart of the process of the transfer function generating circuit 42 according to the third embodiment. $A_0$, $A_1$, $A_2$, $A_3$, $B_0$, $B_1$, $B_2$ and $B_3$ are firstly calculated at a step 1500 according to equations (72) through (79), $\tilde{h}_0$, $\tilde{h}_1$, $\tilde{h}_2$ and $\tilde{h}_3$ at a step 1502 according to equations (81) through (84), and the transfer function $\tilde{G}p(s)$ at a step 1504 according to equation (80). As apparent above, the true transfer function of the process including no transfer function of the sample & hold circuit can be obtained according to the third embodiment of the process control apparatus. The sampled data PID control constants can be obtained from the transfer function $\tilde{G}p(s)$ of the process in the same manner as in the first embodiment.

The result of actually having controlled the process under the sampled data PI control according to the third embodiment was as follows: Table shows the pulse transfer function $\hat{G}p(z)$, transfer function $\tilde{G}p(s)$, proportional gain Kc and differential constant Ti at 5 and 10 seconds after the start of identification; assuming that the true transfer function $\tilde{G}p(s)$ of the process be $$\frac{e^{-0.1s}}{s+1}$$

with the sampling period equal to 0.2 second. It is also assumed that the amplitude of the maximum length sequence signal equal to 0.01, the variance of the observed noise be 0.01, and numbers of identifying parameters $a_m$, $b_n$ and $c_m$ be $m=2$ and $n=6$.

TABLE

| | Pulse Transfer Function Gp(z) | Transfer Function Gp(s) | Kc | Ti |
|---|---|---|---|---|
| 5 [sec] | $\hat{G}p(z) = \dfrac{0.12518z^{-1} + 0.09854z^{-2} - 0.00639z^{-3} - 0.00282z^{-4} + 0.04791z^{-5} - 0.04170z^{-6}}{1 - 0.82274z^{-1} + 0.04615z^{-2}}$ | $\dfrac{1}{1.01 + 0.8185s + 0.0809s^2 + 0.00977s^3 + \ldots}$ | 1.610 | 0.615 |
| 10 [sec] | $\hat{G}p(z) = \dfrac{0.10524z^{-1} + 0.07409z^{-2} - 0.00873z^{-3} - 0.00247z^{-4} - 0.00050z^{-5} + 0.00668z^{-6}}{1 - 0.86417z^{-1} + 0.03961z^{-2}}$ | $\dfrac{1}{1.01 + 1.094s + 0.0967s^2 - 0.005016s^3 + \ldots}$ | 2.472 | 0.903 |

TABLE-continued

| | Pulse Transfer Function Gp(z) | Transfer Function Gp(s) | Kc | Ti |
|---|---|---|---|---|
| Process | $\hat{G}p(z) = \dfrac{0.09516z^{-1} + 0.08611z^{-2}}{1 - 0.81873z^{-1}}$ | $\dfrac{1}{1 + 1.1s + 0.105s^2 + 0.00517s^3 + \ldots}$ | 2.374 | 0.909 |

Figure 16:
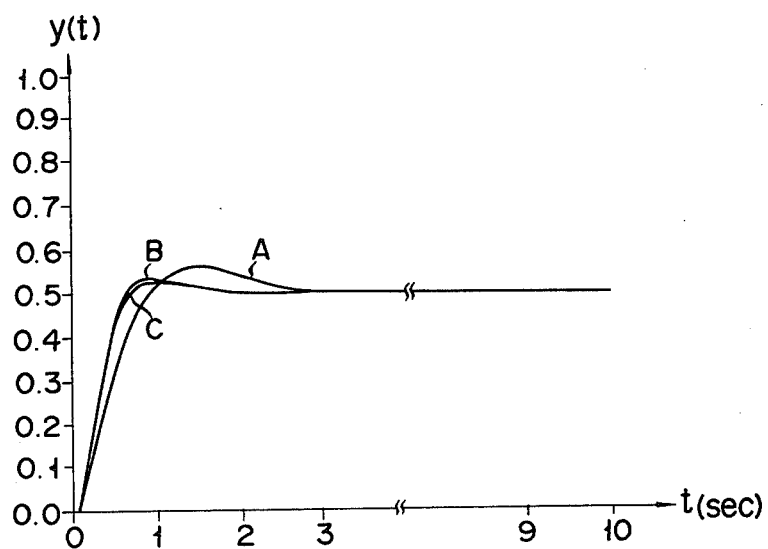
FIG. 16 is a graph of control characteristics of a process showing the operation of third embodiment.

FIG. 16 shows responses of the process signal y(t) when the process was step-responsed (the set-point was changed by 0.5) using the control constants obtained as the result of identification. A curve A represents a response using Kc and Ti at five seconds after the start of identification, curve B a response using Kc and Ti at ten seconds after the start of identification, and curve C a response using true Kc and Ti. The transfer function at ten seconds after the start of identification comes close to the true value and therefore, the response corresponds to the true one. It is also understood that the value at five seconds after the start of identification is almost practical.

Figure 17:
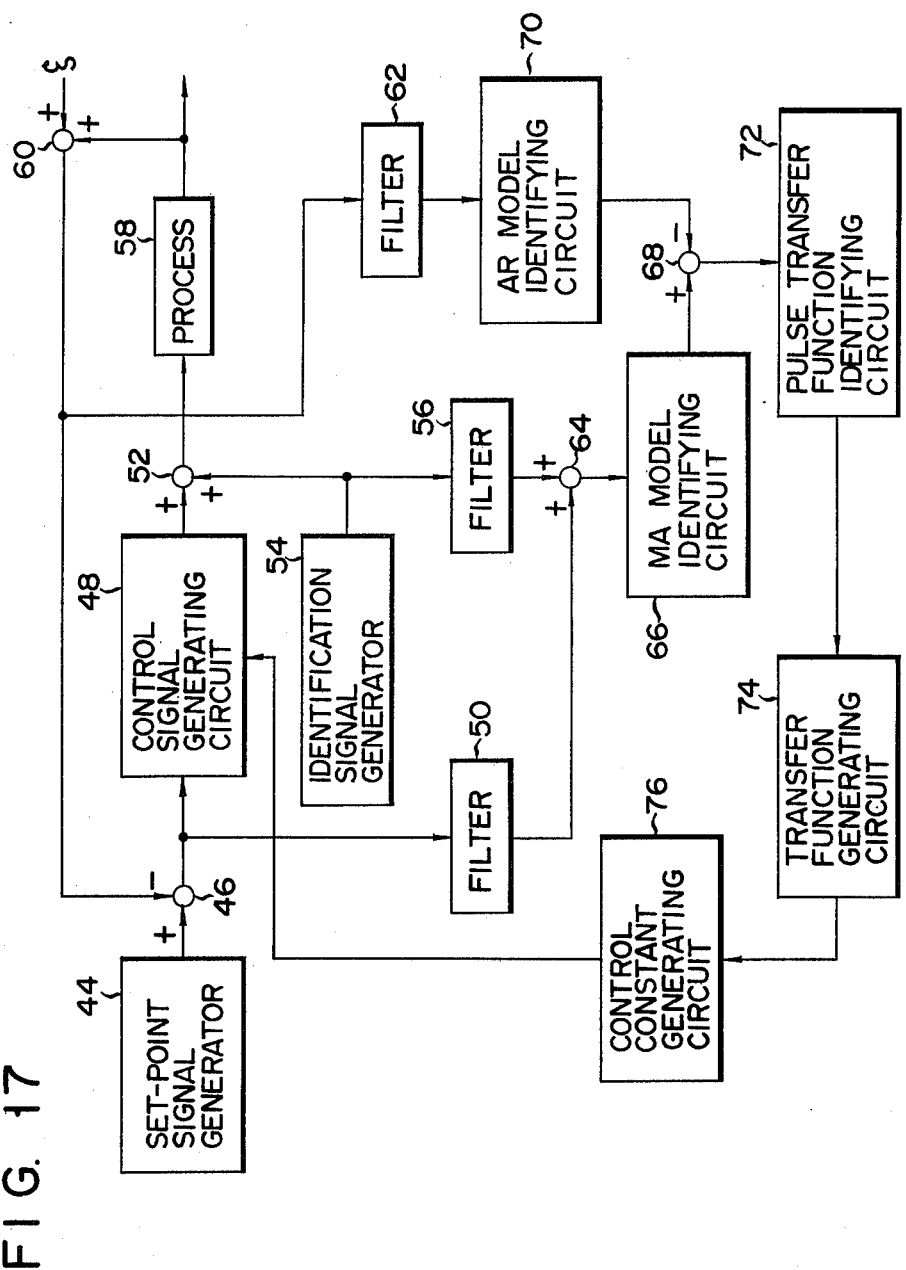
FIG. 17 is a block diagram showing a fourth embodiment of a process control apparatus according to the present invention.

FIG. 17 is a block diagram showing a fourth embodiment of a process control apparatus according to the present invention. The output terminal of a set-point signal generator 44 is connected to a first input terminal of a subtracter 46, whose output terminal is connected to input terminals of a control signal generating circuit 48 and a filter 50. An output terminal of the control signal generating circuit 48 is coupled to a first input terminal of an adder 52. An output terminal of an identification signal generator 54 is connected to a second input terminal of the adder 52 and an input terminal of a filter 56. An output terminal of the adder 52 is connected to a process 58. An output signal of the process 58 is fed back, as a process signal, to the subtracter 46 and also supplied to a filter 62. Output signals of the filters 50 and 56 are added with each other by an adder 64 and supplied to an MA (moving average) model identifying circuit 66, whose output terminal is connected to a first input terminal of a subtracter 68. An output signal of the filter 62 is applied to an AR (autoregressive) model identifying circuit 70, whose output terminal is connected to a second input terminal of the subtracter 68. An output terminal of the subtracter 68 is connected to a pulse transfer function identifying circuit 72, of which output terminal is connected to an input terminal of a transfer function generating circuit 74. An output terminal of the transfer function generating circuit 74 is connected to a control constant generating circuit 76, whose output terminal is connected to the control signal generating circuit 48.

It is assumed that a signal of each section be a discrete one and sampled & held to be supplied to the process 58 successively in time. Providing that the set-point signal be represented by r(k) and process signal fed back from the process 58 to the subtracter 46 be represented by y(k), the deviation signal e*(k) applied from the subtracter 46 equals to r(k)−y(k). The process signal y(k) contains observed noise & such as sampling error which can not be measured. The control signal generating circuit 48 calculates the control signal u0*(k) as follows using the deviation signal e*(k):

$$u_0^*(k) = K\left[ e^*(k) + \frac{\tau}{2Ti} \sum_{j=-\infty}^{k} \{e^*(k) + e^*(k-1)\} + \right. \tag{85}$$

-continued
$$\left. \frac{Td}{\tau}\{e^*(k) - e^*(k-1)\} \right]$$

Equation (85) can be expressed as follows using the time shift operator z:

$$u_0^*(k) = \frac{D(z^{-1})}{C(z^{-1})} e^*(k) \tag{86}$$

wherein $$C(z^{-1}) = 1 - z^{-1} \tag{87}$$

$$D(z^{-1}) = d_0 + d_1 z^{-1} + d_2 z^{-2} \tag{88}$$

$$d_0 = Kc\left(1 + \frac{\tau}{2Ti} + \frac{Td}{\tau}\right) \tag{89}$$

$$d_1 = -Kc\left(1 - \frac{\tau}{2Ti} + \frac{2Td}{\tau}\right) \tag{90}$$

and $$d_2 = Kc\frac{Td}{\tau} \tag{91}$$

This control signal u0*(k) is added with the identifying signal v*(k) such as the maximum length sequence signal to be applied, as the operation signal u*(k), to the process 58.

The output signal x(k) of the process 58 is expressed as follows using ARMA (autoregressive moving average) model:

$$x(k) = \frac{B(z^{-1})}{A(z^{-1})} u^*(k) \tag{92}$$

wherein $$A(z^{-1}) = 1 + a_1 z^{-1} + a_2 z^{-2} + \ldots + a_m z^{-m} \tag{93}$$

and $$B(z^{-1}) = b_1 z^{-1} + b_2 z^{-2} + \ldots + b_m z^{-m} \tag{94}$$

The deviation signal e*(k), identifying signal v*(k) and process signal y*(k) are supplied to the filters 50, 56 and 62, respectively. The properties of the filters 50, 56 and 62 are expressed by D(z$^{-1}$), C(z$^{-1}$) and C(z$^{-1}$) of equations (87) and (88), and the output signals R(k), V(k) and Y(k) are expressed as follows:

$$R(k) = D(z^{-1})e^*(k) \tag{95}$$
$$V(k) = C(z^{-1})v^*(k) \tag{96}$$
$$Y(k) = C(z^{-1})y^*(k) \tag{97}$$

The output signals of the filters 50 and 56 are added with each other by the adder 64 and supplied to the MA model identifying section 66. The MA model means a model of the numerator of ARMA model shown in equation (92) and the output signal Bo(k) of the MA model identifying section 66 becomes as follows:

$$Bo(k) = \sum_{i=1}^{m} b_i z^{-i} \cdot \{R(k) + V(k)\} \quad (98)$$

$$= \hat{B}(z^{-1}) \cdot \{R(k) + V(k)\}$$

Similarly, the output signal of the filter 62 is supplied to the AR model identifying circuit 70 which identifies the denominator of ARMA model shown in equation (92), and the output signal Ao(k) of the AR model identifying circuit 70 becomes as follows:

$$Ao(k) = \left(1 + \sum_{i=1}^{m} a_i z^{-i}\right) \cdot Y(k) = \hat{A}(z^{-1}) \cdot Y(k)$$

The output signals of the MA identifying circuit 66 and AR identifying circuit 70 are applied to the subtracter 68 and the following identifying error signal $\epsilon(k)$ is supplied to the pulse transfer function identifying section 72:

$$\epsilon(k) = -\hat{A}(z^{-1}) \cdot Y(k) + \hat{B}(z^{-1}) \cdot \{R(k) + V(k)\} \quad (100)$$

The pulse transfer function identifying circuit 72 calculates parameters $\hat{a}_i$ and $\hat{b}_i$, in which $i=1 \sim m$, of $\hat{A}(z^{-1})$ and $\hat{B}(z^{-1})$ which make minimum the sum of square of $\epsilon(k)$ and then the pulse transfer function from $$\frac{\hat{B}(z^{-1})}{\hat{A}(z^{-1})}$$

in equation (92). It is assumed that the vector of the unknown parameters $\hat{a}_i$ and $\hat{b}_i$ to be identified be represented by $\theta$.

$$\theta^T = (\hat{a}_1, \hat{a}_2, \ldots, \hat{a}_m, \hat{b}_1, \hat{b}_2, \ldots, \hat{b}_m) \quad (101)$$

For the purpose of obtaining $\theta$, the following operation may be carried out using the principle of Kalman filter:

$$\theta(k) = \theta(k-1) + P(k-1)\phi(k)\{\sigma^2 + \phi(k)^T P(k-1)\phi(k)\}^{-1}\{Y(k) - \phi(k)^T \theta(k-1)\} \quad (102)$$

wherein $\phi(k)^T = \{-Y(k-1), -Y(k-2), \ldots, -Y(k-m), \quad (103)$
$R(k-1) + V(k-1), R(k-2) + V(k-2), \ldots,$
$R(k-n) + V(k-n)\}$ and $P(k) = P(k-1) - P(k-1)\phi(k)\{\sigma^2 + \phi(k)^T P(k-1)\phi(k)\}^{-1}\phi(k)^T P(k-1) \quad (104)$ $\sigma^2$ represents the variance of the observed noise & and has a value of about $10^{-4} \sim 10^{-6}$. P(k) represents the covariance matrix of $2m \times 2m$. Initial values at the time of identification start are assumed to be $\theta(o) = 0$ and $P(o) = I$, and when the previous value is not changed, $\theta(o)$ is used as the previous value to shorten the time period during which identification is finished.

When $\theta$, namely, $\hat{a}_i$ and $\hat{b}_i$, in which $i=1 \sim m$, are identified in the pulse transfer function identifying section 72, $\hat{a}_i$ and $\hat{b}_i$ are supplied to the transfer function generating circuit 74. Providing that the identified transfer function be represented by $\hat{G}(z^{-1})$, $\hat{G}(z^{-1})$ becomes as follows:

$$\hat{G}(z^{-1}) = \frac{\hat{B}(z^{-1})}{\hat{A}(z^{-1})} = \sum_{i=1}^{\infty} \hat{g}_i z^{-i} \quad (105)$$

wherein $\hat{g}_1 = \hat{b}_1$ \quad (106-1)

$$\hat{g}_2 = \hat{b}_2 - \hat{a}_1 \hat{g}_1 \quad (106\text{-}2)$$

$$\hat{g}_3 = \hat{b}_3 - \hat{a}_1 \hat{g}_2 - \hat{a}_2 \hat{g}_1 \quad (106\text{-}3)$$

$$\hat{g}_m = \hat{b}_m - \hat{a}_1 \hat{g}_{m-1} - \hat{a}_2 \hat{g}_{m-2} - \ldots - \hat{a}_m \hat{g}_1 \quad (106\text{-}M)$$

The transfer function generating circuit 74 approximates the transfer function G(s) as follows using the time constant T, dead time L and plant gain K of the process:

$$G(s) = \frac{Ke^{-LS}}{TS + 1} \quad (107)$$

Providing that the maximum of $\hat{g}_i$ be represented by $g_{max}$ and the time at which $\hat{g}_{max}$ is given be represented by $t_{max}$, the time constant T, dead time L and process gain K are expressed as follows:

$$T = \frac{\tau}{\hat{g}_{max}} K \quad (108)$$

$$L = \left(t_{max} - \frac{\sum_{i=1}^{m} \hat{g}_i}{\hat{g}_{max}}\right) \tau \quad (109)$$

$$K = \frac{\sum_{i=1}^{m} \hat{b}_i}{1 + \sum_{i=1}^{m} \hat{a}_i} \quad (110)$$

The control constant generating circuit 76 calculates the proportional gain Kc, integral time constant Ti and derivative time constant Td as follows using T, L and K obtained in the transfer function generating circuit 74:

$$Kc = 0.7 \frac{T}{KL}\left(1 + \frac{1}{0.8\tau/L}\right) \quad (111)$$

$$Ti = T \quad (112)$$

$$Td = 0.5L(1 + 5\tau/L) \quad (113)$$

wherein $\tau$ represents the sampling period of the process 58 and $\tau < L$. Kc, Ti and Td obtained in the control constant generating circuit 76 are put into equations (89) through (91) to obtain $d_0$, $d_1$ and $d_2$, which are supplied to the control signal generating circuit 48. The control signal generating circuit 48 calculates $u_0*(k)$ shown by equation (86) using $d_0$, $d_1$ and $d_2$.

As described above, process control using the ARMA model is made possible according to this embodiment.

A modification of the fourth embodiment of the process control apparatus according to the present invention will be now described. This embodiment is intended to control the process using not ARMA model but MA model. The block diagram of this embodiment is omitted because it is different from the one shown in FIG. 17 only in that the AR model identifying section 70 is excluded and that the output terminal of the filter 62 is connected direct to the second input terminal of the subtracter 68.

According to this embodiment, the dynamic characteristics of the process can be expressed as follows using MA model and providing that the output signal of the process be represented by x(k):

$$x(k) = G(z^{-1})u^*(k) \quad (114)$$

$$\text{wherein } G(z^{-1}) = \sum_{i=1}^{\infty} g_i z^{-i} \quad (115)$$

The output signals R(k) and V(k) of the filters 50 and 56 are supplied via the adder 64 to the MA model identifying section 66. The MA model identifying section 66 generates the process identification signal $\hat{G}(z^{-1})$ having i of finite term (Ng term) in equation (115).

$$\hat{G}(z^{-1}) = \sum_{i=1}^{Ng} \hat{g}_i z^{-i} \quad (116)$$

It is preferable from the viewpoint of accuracy that Ng in equation (116) is as large as possible, but if so, identifying time is substantially increased. Therefore, Ng is determined as follows using rough time constant To and dead time Lo of the controlled process:

$$Ng = \frac{To + Lo}{\tau} \quad (117)$$

As the result, the identification error signal $\epsilon(k)$ generated from the subtractor 68 becomes as follows:

$$\epsilon(k) = -Y(k) + \sum_{i=1}^{Ng} \hat{g}_i \cdot \{R(k-i) + V(k-i)\}$$

The pulse transfer function identifying section 72 calculates $g_i(i=1\sim Ng)$, which makes minimum the sum of square of $\epsilon(k)$, in the same way as in the fourth embodiment. Thereafter, the PID control constant Kc, Ti and Td are similarly calculated and the operation signal $u_0^*(k)$ is then calculated to be supplied to the process.

A fifth embodiment of the process control apparatus according to the present invention will be now described referring to the block diagram shown in FIG. 18. The embodiment is fundamentally the same as the modified fourth embodiment. With the fifth embodiment, a signal fed back from the process 58 is supplied to a variance generating circuit 80, whose output signal is supplied to a correction circuit 82. An output signal of the control constant generating circuit 76 is also supplied to the correction circuit 82. An output signal of the correction circuit 82 is supplied to the identification signal generator 54.

The amplitude Am and the sampling period $\tau$ of the output identification signal of the identification signal generator 54 are determined by the correction circuit 82. The dynamic characteristics of the usual process can be aproximated by the first order system with dead time. Therefore, the standard deviation $\sigma_y$ of the fluctuation of the process signal is expressed as follows:

$$\sigma_y = \sqrt{\frac{b_1^2 + b_2^2 - a_1 b_1 b_2}{1 - a_1^2}} \, Am \quad (118)$$

-continued $$\text{wherein } a_1 = -e^{-\frac{\tau}{To}} \quad (119)$$

$$b_1 = Ko\left(1 + a_1 e^{\frac{Lo}{To}}\right) \quad (120)$$

and $$b_2 = -Koa_1\left(e^{\frac{Lo}{To}} - 1\right) \quad (121)$$

Ko represents the plant gain, To time constant, Lo dead time constant and $\tau$ sampling period. When the sampling period $\tau$ is made too short, the term number of the pulse transfer function to identify increases. It is therefore preferable to set $t=(To+Lo)/10$. Providing that the fluctuation amount of the process signal which the user considers allowable be represented by $\overline{\sigma}_y$, the amplitude Am of the maximum length sequence signal is expressed as follows from equation (118):

$$Am = \frac{\overline{\sigma}_y}{\sqrt{\frac{b_1^2 + b_2^2 - a_1 b_1 b_2}{1 - a_1^2}}} \quad (122)$$

The correction circuit 82 calculates Am according to equation (122) and supplies to the identification signal generator 54 a signal corresponding to Am, thus allowing the amplitude of the identification signal to be set Am which is expressed by equation (122). Namely, the maximum length sequence signal v(k) having amplitude Am is added every time period $\tau$ with the output signal $u_0^*(k)$ of the control signal generating circuit 48 to become control signal $u^*(k)$ applied to the process. Therefore, the impulse response of the controlled process which is stopped at the time $Ng.\tau$ is identified from the process signals $\{y(k), k=1, 2, \ldots, Ng\}$. The fluctuation of this process is expressed as the variance of the process signals $\{y(k), k=1, 2, \ldots, Ng\}$ during identification. The variance generating circuit 80 calculates the fluctuation amount i.e. variance $\hat{\sigma}_y$ of process as follows:

$$\hat{\sigma}_y = \sqrt{\frac{1}{n} \sum_{i=1}^{n} y_i^2 - \mu_y^2} \quad (123)$$

$$\text{wherein } \mu_y = \frac{1}{n} \sum_{i=1}^{n} y_i \quad (124)$$

Figure 19:
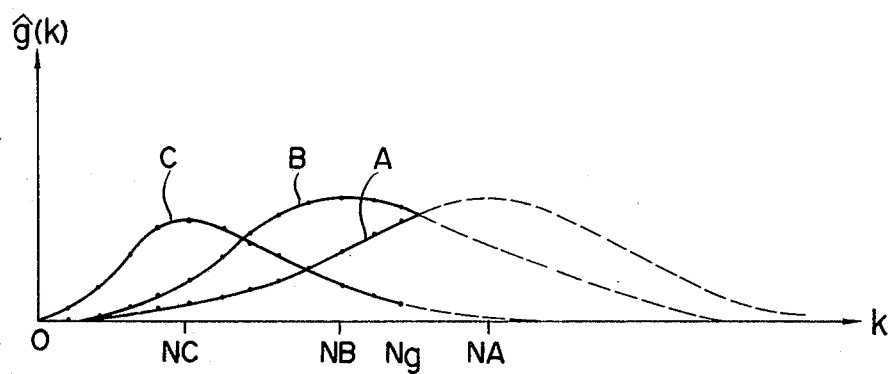
FIG. 19 is a graph of impulse characteristics of a process showing the operation of this sixth embodiment.

When the number of the identifying parameters is cut off to be Ng, a case where the control constants are not designed appropriately is caused. Or because the impulse response is cut off at a small number of Ng term, a case where identification is not enough is caused. Cases where identification is not enough are represented by curves A and B in FIG. 19. The axis of abscissas represents sampling times $k(=t/\tau)$ and the axis of ordinates the identifying parameters $\hat{g}(k)$. Number Ng of the identifying parameters may be increased to avoid these drawbacks, but it is not advantageous because calculating amount increases. Therefore, in the case of identification having characteristics as shown by curves A and B in FIG. 19, the sampling period $\tau$ of the maximum length sequence signal may be made long to change characteristics of identification to the one shown by curve C in FIG. 19. For example, as for a process having characteristics shown by curve A in FIG. 19, the sampling period $\tau$ is made 5 times so as to make half sampling times NA which give $\hat{g}_{max}$. Or as for a process having characteristics shown by curve B, the sampling period $\tau$ is made 2.5 times so as to make NB half. When the the sampling period of the identification signal is changed like this, the fluctuation amount of the process signal becomes large, but since the fluctuation is proportional to the square root of the sampling period in a range in which the sampling period is shorter enough than the time constant of the process, the amplitude Am of the identification signal is corrected as follows:

$$Am = \sqrt{\frac{\tau \text{ (old)}}{\tau \text{ (new)}}} \cdot \frac{\overline{\tau_y}}{\hat{\tau}_y} \cdot Am \text{ (old)} \quad (125)$$

wherein $\tau$ (old) and Am (old) represent the sampling period and amplitude employed till now, and $\tau$ (new) the sampling period which is employed to effect identification this time. Identification is again carried out using the period and the amplitude thus corrected.

When the sampling times N which give maximum value $\hat{g}_{max}$ of the identifying parameters $\hat{g}(k)$ are larger than half of the sampling times n and the fluctuation amount of the control amount of the process is larger than the allowable value $\overline{\sigma_y}$, the amplitude Am of the maximum length sequence signal is corrected as follows:

$$Am = \frac{\overline{\sigma_y}}{\sigma_y} Am \text{ (old)} \quad (126)$$

Figure 20:
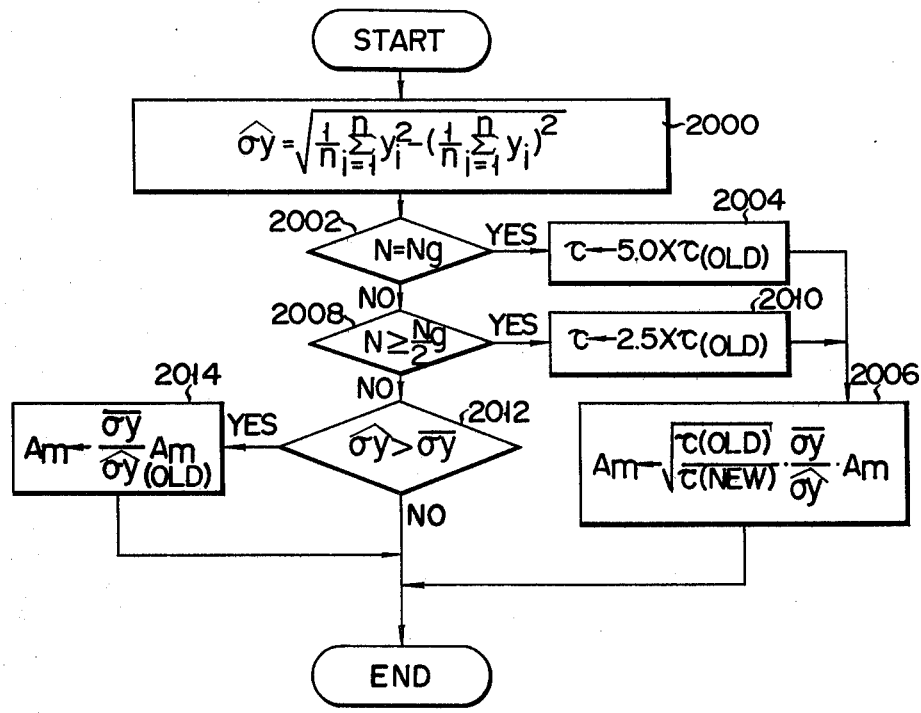
FIG. 20 is a flow chart of a correction circuit shown in FIG. 18.

The correction circuit 82 determines the amplitude and the sampling period of identification signal according to the above-described algorithm and supplies the indication signal to the identification signal generator 54. FIG. 20 shows the flow chart of the correction circuit 82. The fluctuation amount $\hat{\sigma}_y$ of the process is obtained at a step 2000 according to equation (123). It is then checked whether or not the sampling times N for giving maximum value $\hat{g}_{max}$ of the identifying parameters equal to the number n of identifying parameters. If so, the cycle $\tau$ is made 5 times at a step 2004 and the amplitude Am is then determined at a step 2006 according to equation (125). When N is not equal to Ng, it is further checked at a step 2008 whether or not N is larger than Ng/2. When N is larger than Ng/2, the sampling period $\tau$ is made 2.5 times at a step 2010 and the step 2006 is carried out. When N is smaller than Ng/2, the number of identifying parameters is enough showing identification to be effected enough. However, because the calculation takes a long time even in this case when the fluctuation of the control amount of the process is too large, it is necessary to correct amplitude. It is therefore checked at a step 2012 whether or not the fluctuation amount, i.e. the variance $\overline{\sigma_y}$ of the process is larger than the allowable fluctuation amount $\overline{\sigma_y}$. When $\overline{\sigma_y}$ is larger than $\overline{\sigma_y}$, the amplitude Am is corrected at a step 2014 according to equation (126). When $\overline{\sigma_y}$ is smaller than $\overline{\sigma_y}$, no correction is made.

As described above, this embodiment allows the accurate process identification to be quickly effected by adjusting the sampling period and amplitude of the identification signal, even in the case where the parameters for identifying the impulse response are cut off at finite term.

It should be understood that the present invention is not limited to embodiment described and shown above. Though not shown, an output section comprising a pen recorder, a CRT and the like to display or record the output signal of the transfer function generating circuit may be further arranged to provide an apparatus for automatically measuring process dynamic characteristics. If the proportional gain Kc of the process control constants is fixed zero, the process control can be operated in open loop. Though the pulse transfer function identifying circuit employs the iterative maximum likelihood method, other identifying methods, by which unbiased estimates are obtained, such as expanded least square method, instrumental variable method and parameter identifying method of model standardizing type may be employed. The identification signal may be those belonging to a stationary random process and therefore, pseudeo random signal except maximum length sequence signal and normal random number signal can be employed. Or the maximum length sequence signal once passed through digital filters may be used. Further, the dynamic characteristics of the process may be approximated using AR model.

What is claimed is:

1. A process control apparatus comprising:
   set-point signal generating means for generating a set-point signal of an output of said process;
   controller means for controlling a process input of said process in accordance with control constants and a control error which is a difference between the set-point signal and said process output;
   identification signal generating means for superimposing a persistently exciting identification signal on said process input;
   identifying means for identifying a pulse transfer function of said process in accordance with said process input on which the persistently exciting identification signal is superimposed and said process output;
   calculating means for calculating an S-transfer function of said process from the pulse transfer function identified by said identifying means; and
   control constant generating means for tuning the control constants in said controller means in accordance with a result of model-matching of the S-transfer function calculated by said calculating means with an S-transfer function of a reference process model.

2. A process control apparatus according to claim 1, wherein said identification signal generating means generates a maximum length sequence signal.

3. A process control apparatus according to claim 1, wherein said identifying means is connected to said controller means and comprises a filter of iterative maximum likelihood type to estimate the pulse transfer function according to said process input and said process output.

4. A process control apparatus according to claim 1, wherein said calculating means connects two adjacent step responses at the pulse transfer function obtained by said identifying means with a straight line and Laplace—transforms a function obtained by the connection.

5. A process control apparatus according to claim 1, wherein said calculating means calculates an S-transfer function of a second order process with a dead time, using a step response on said pulse transfer function.

6. A process control apparatus according to claim 1, wherein said calculating means calculates an S-transfer function of said process except that of a sample and hold circuit in the process control apparatus.

7. A process control apparatus according to claim 1, wherein said controller means includes a subtracter for producing a control error between the set-point signal and said process input, and a PID control circuit for controlling said process input according to the control error and control constants, and said control constant generating means produces PID control constants.

8. A process control apparatus according to claim 7, further comprising first operating means connected to said process and transforming said process output to a first signal; a second operating means connected to said identification signal generating means and transforming the persistently exciting signal to a second signal; and a third operating means connected to the subtractor of said controller means and transforming the control error to a third signal.

9. A process control apparatus according to claim 8, wherein said identifying means processes coefficients of autoregressive moving average model of said process responsive to the output signals of said first, second and third operating means.

10. A process control apparatus according to claim 8, wherein said identifying means processes coefficients of moving average model of said process in response to the output signal of said first, second and third operating means.

11. A process control apparatus according to claim 10, wherein said identifying means processes those of coefficients of moving average model of said process which correspond to a finite term, and which further comprises means for determining the amplitude of the persistently exciting signal according to the variance of said process output and further determining a sampling period and an amplitude of the persistently exciting signal in response to a step response of the identified pulse transfer function.

* * * * *